(12) United States Patent
Kang et al.

(10) Patent No.: US 12,388,986 B2
(45) Date of Patent: Aug. 12, 2025

(54) METHOD AND APPARATUS FOR ENCODING/DECODING IMAGE, AND RECORDING MEDIUM FOR STORING BITSTREAM

(71) Applicant: Electronics and Telecommunications Research Institute, Daejeon (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/317,800

(22) Filed: May 15, 2023

(65) Prior Publication Data
US 2023/0308644 A1    Sep. 28, 2023

Related U.S. Application Data

(63) Continuation of application No. 17/278,173, filed as application No. PCT/KR2019/012278 on Sep. 20, 2019, now Pat. No. 11,695,926.

(30) Foreign Application Priority Data

Sep. 21, 2018  (KR) .................. 10-2018-0113971
Dec. 31, 2018  (KR) .................. 10-2018-0173850

(51) Int. Cl.
*H04N 19/107*    (2014.01)
*H04N 19/119*    (2014.01)
(Continued)

(52) U.S. Cl.
CPC ......... *H04N 19/107* (2014.11); *H04N 19/119* (2014.11); *H04N 19/139* (2014.11);
(Continued)

(58) Field of Classification Search
CPC .. H04N 19/107; H04N 19/119; H04N 19/124; H04N 19/139; H04N 19/176;
(Continued)

(56) References Cited

U.S. PATENT DOCUMENTS

| | | | |
|---|---|---|---|
| 9,681,128 B1 | 6/2017 | Han et al. | |
| 2006/0039476 A1* | 2/2006 | Watanabe | H04N 19/132 375/240.24 |

(Continued)

FOREIGN PATENT DOCUMENTS

| | | |
|---|---|---|
| KR | 100772576 B1 | 11/2007 |
| KR | 1020180058233 A | 5/2018 |

(Continued)

OTHER PUBLICATIONS

Adarsh K. Ramasubramonian et al., CE3-3.1.1: Two MPM modes and shape dependency (Test 3.1.1), Joint Video Exploration Team (JVET) of ITU-T SG 16 WP 3 and ISO/IEC JTC 1/SC 29/WG 11, JVET-K0081, 11th Meeting: Ljubljana, SI, Jul. 10-18, 2018, Qualcomm Inc.

(Continued)

*Primary Examiner* — Md N Haque
(74) *Attorney, Agent, or Firm* — Sughrue Mion, PLLC

(57) ABSTRACT

An image decoding method is disclosed in the present specification. An image decoding method according to the present invention may comprise determining a prediction mode of a current block and performing prediction with respect to the current block on the basis of the determined prediction mode.

8 Claims, 14 Drawing Sheets

(51) Int. Cl.
*H04N 19/139* (2014.01)
*H04N 19/176* (2014.01)
*H04N 19/573* (2014.01)
*H04N 19/124* (2014.01)

(52) U.S. Cl.
CPC ......... *H04N 19/176* (2014.11); *H04N 19/573* (2014.11); *H04N 19/124* (2014.11)

(58) Field of Classification Search
CPC .... H04N 19/573; H04N 19/105; H04N 19/13; H04N 19/184; H04N 19/186; H04N 19/51; H04N 19/60; H04N 19/61; H04N 19/91
See application file for complete search history.

(56) References Cited

U.S. PATENT DOCUMENTS

| | | | |
|---|---|---|---|
| 2006/0146191 A1 | 7/2006 | Kim et al. | |
| 2019/0007688 A1* | 1/2019 | Zhang | ................ H04N 19/159 |
| 2019/0289287 A1* | 9/2019 | Park | .................... H04N 19/593 |
| 2019/0313116 A1* | 10/2019 | Lee | ...................... H04N 19/593 |
| 2019/0364284 A1* | 11/2019 | Moon | ................. H04N 19/513 |

FOREIGN PATENT DOCUMENTS

| | | |
|---|---|---|
| KR | 102310730 B1 | 10/2021 |
| WO | 2001086962 A1 | 11/2001 |
| WO | 2012030193 A2 | 3/2012 |
| WO | 2016072775 A1 | 5/2016 |
| WO | 2018132380 A1 | 7/2018 |

OTHER PUBLICATIONS

Li Zhang et al., CE4-related: History-based Motion Vector Prediction, Joint Video Experts Team (JVET) of ITU-T Sg 16 WP 3 and ISO/IEC JTC 1/SC 29/WG, 11, JVET-K0104-v5, 11th Meeting: Ljubljana, SI, Jul. 10-18, 2018, Bytedance Inc.

Ru-Ling Liao et al., CE10: Triangular prediction unit mode (CE10.3.1 and CE10.3.2), Joint Video Exploration Team (JVET) of ITU-T SG 16 WP 3 and ISO/IEC JTC 1/SC 29/WG 11, JVET-K0144-v2, 11th Meeting: Ljubljana, SI, Jul. 10-18, 2018, Panasonic.

* cited by examiner

METHOD AND APPARATUS FOR ENCODING/DECODING IMAGE, AND RECORDING MEDIUM FOR STORING BITSTREAM

CROSS-REFERENCE TO RELATED APPLICATIONS

The present application is a continuation application of U.S. application Ser. No. 17/278,173, filed on Mar. 19, 2021, which was the National Stage of International Application No. PCT/KR2019/012278 filed on Sep. 20, 2019, which claims priority to Korean Patent Applications: KR10-2018-0113971, filed on Sep. 21, 2018, and KR10-2018-0173850, filed on Dec. 31, 2018, with the Korean Intellectual Property Office, which are incorporated herein by reference in their entirety.

TECHNICAL FIELD

The present invention relates to a method and an apparatus for encoding/decoding an image, and a recording medium for storing a bitstream. More particularly, the present invention relates to a method and an apparatus for encoding/decoding an image on the basis of an overlapped block motion compensation and a candidate list, and a recording medium for storing a bitstream.

Background Art

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

DISCLOSURE

Technical Problem

An objective of the present invention is to provide an image encoding/decoding method and apparatus capable of improving compression efficiency, and a recording medium in which a bitstream generated by the method or apparatus is stored.

Another objective of the present invention is to provide an image encoding/decoding method and apparatus capable of improving compression efficiency by using overlapped block motion compensation and a recording medium in which a bitstream generated by the method or apparatus is stored.

Another objective of the present invention is to provide an image encoding/decoding method and apparatus capable of improving compression efficiency by using candidate list and a recording medium in which a bitstream generated by the method or apparatus is stored.

Technical Solution

According to the present invention, image decoding method comprises determining a prediction mode of a current block and performing prediction with respect to the current block on the basis of the determined prediction mode.

wherein, in a case where the prediction mode of the current block is determined to be an intra prediction mode, the performing of the prediction with respect to the current block by using the determined prediction mode comprises deriving a first MPM list and a second MPM list for deriving an intra prediction mode of the current block, determining whether or not the intra prediction mode of the current block is included in at least one of the first MPM list and the second MPM list, and determining the intra prediction mode of the current block using the first MPM list and the second MPM list, in a case where the intra prediction mode of the current block is included in at least one of the first MPM list and the second MPM list.

wherein the determining of whether or not the intra prediction mode of the current block is included in at least one of the first MPM list and the second MPM list comprises, determining whether or not the intra prediction mode of the current block is included in the first MPM list, and determining whether or not the intra prediction mode of the current block is included in the second MPM list, in a case where the intra prediction mode of the current block is not included in the first MPM list.

wherein the first MPM list includes a planar mode.

The image decoding method further comprises determining the intra prediction mode of the current block using a residual intra prediction mode candidate list in a case where the intra prediction mode of the current block is not included in at least one of the first MPM list and the second MPM list, wherein the residual intra prediction mode candidate list includes intra prediction modes that are not included in at least one of the first MPM list and the second MPM list.

wherein in a case where the intra prediction mode of the current block is determined to be an inter prediction mode, the performing prediction with respect to the current block on the basis of the determined prediction mode comprises, deriving motion information of the current block, deriving a history-based merge candidate using the motion information of the current block, adding the history-based merge candidate to a history-based merge candidate list and deriving a merge candidate list using the history-based merge candidate list, wherein the merge candidate list is used for inter prediction of a block that is to be decoded after the current block.

wherein the history-based merge candidate list includes a history-based merge candidate that is derived using motion information of a block that has been decoded before the current block.

wherein in a case where the block that has been decoded before the current block and the current block belong to different coding tree units (CTUs), respectively, the history-based merge candidate that is derived on the basis of the motion information of the current block is not added to the history-based merge candidate list.

wherein only in a case where an affine mode or a subblock-based temporal motion vector derivation mode is not applied to the current block, the history-based merge candidate is added to the history-based merge candidate list.

wherein the adding of the history-based merge candidate to a history-based merge candidate list comprises: deleting a candidate that is included earliest in the history-based merge candidate list, of candidates included in the history-based merge candidate list, in a case where the number of candidates that are included in the history-based merge candidate list is a pre-defined value and adding the history-based merge candidate in a manner to be positioned next to a candidate that is latest included in the history-based merge candidate list.

wherein the deriving of a merge candidate list using the history-based merge candidate list comprises, adding a candidate that is included in the history-based merge candidate list to the merge candidate list.

wherein in a case where the prediction mode of the current block is determined to be a triangle partition mode, the performing of the prediction with respect to the current block on the basis of the determined prediction mode comprises, partitioning the current block into a first subblock and a second subblock, generating a first prediction block with respect to the first subblock and a second prediction block with respect to the second subblock and generating a prediction block with respect to the current block using a weighted sum of the first prediction block and the second prediction block.

wherein the generating of the first prediction block with respect to the first subblock and the second prediction block with respect to the second subblock comprises, acquiring a first index for the generation of the first prediction block and a second index for the generation of the second prediction block, from a bitstream, generating the first prediction block using first motion information that is indicated by the first index and generating the second prediction block using second motion information that is indicated by the second index.

wherein the first index and the second index indicate at least one of pieces of motion information of neighboring blocks adjacent to the current block.

wherein in order to obtain the weighted sum, weighting-based summing is performed only on boundary regions of the first subblock and the second subblock.

According to the present invention, an image encoding method comprises determining a prediction mode of a current block and performing prediction with respect to the current block on the basis of the determined prediction mode.

wherein in a case where the prediction mode of the current block is determined to be an intra prediction mode, the performing of the prediction with respect to the current block on the basis of the determined prediction mode comprises, deriving a first MPM list and a second MPM list for deriving the intra prediction mode of the current block, determining whether or not the intra prediction mode of the current block is included in at least one of the first MPM list and the second MPM list; and determining the intra prediction mode of the current block, using the first MPM list and the second MPM list, in a case where the intra prediction mode of the current block is included in at least one of the first MPM list and the second MPM list.

wherein in a case where the prediction mode of the current block is determined to be an inter prediction mode, the performing of the prediction with respect to the current block on the basis of the determined prediction mode comprises deriving motion information of the current block, deriving a history-based merge candidate using the motion information of the current block, adding the history-based merge candidate to a history-based merge candidate list and deriving a merge candidate list using the history-based merge candidate list, wherein the merge candidate list is used for inter prediction of a block that is to be encoded after the current block.

wherein in a case where the prediction mode of the current block is determined to be a triangle partition mode, the performing of the prediction with respect to the current block on the basis of the determined prediction mode comprises, partitioning the current block into a first subblock and a second subblock, generating a first prediction block with respect to the first subblock and a second prediction block with respect to the second subblock and generating a prediction block with respect to the current block using a weighted sum of the first prediction block and the second prediction block.

According to a present invention, a computer-readable recording medium in which a bitstream is stored, the bitstream being received by an image decoding apparatus and being used to reconstruct a current block in a current picture, wherein the bitstream includes information on a prediction mode of the current block, the information on the prediction mode is used to decide the prediction mode of the current block and the determined prediction mode is used to perform the prediction with respect to the current block.

Advantageous Effects

According to the present invention, it is possible to provide an image encoding/decoding method and apparatus capable of improving compression efficiency and to provide a recording medium in which a bitstream generated by the method or apparatus is stored.

In addition, according to the present invention, it is possible to provide an image encoding/decoding method and apparatus capable of improving compression efficiency by using overlapped block motion compensation and a recording medium in which a bitstream generated by the method or apparatus is stored.

In addition, according to the present invention, it is possible to provide an image encoding/decoding method and apparatus capable of improving compression efficiency by using candidate list and a recording medium in which a bitstream generated by the method or apparatus is stored.

BEST MODE

Figure 1:
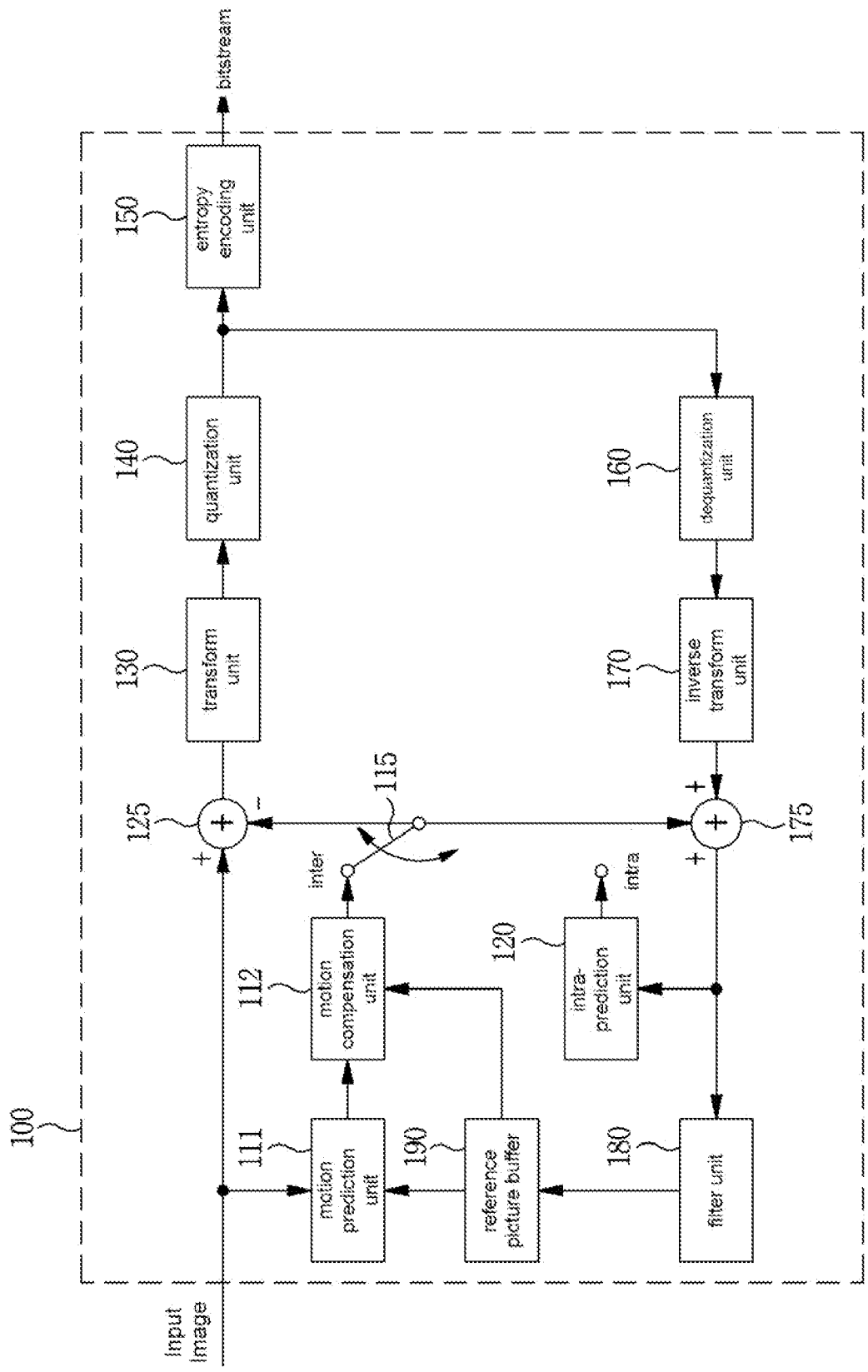
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block.

In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

The adaptation parameter set refers to a parameter set that can be shared and referred to by different pictures, subpictures, slices, tile groups, tiles, or bricks. In addition, subpictures, slices, tile groups, tiles, or bricks in a picture may refer to different adaptation parameter sets to use information in the different adaptation parameter sets.

Regarding the adaptation parameter sets, sub-pictures, slices, tile groups, tiles, or bricks in a picture may refer to different adaptation parameter sets by using identifiers of the respective adaptation parameter sets.

Regarding the adaptation parameter sets, slices, tile groups, tiles, or bricks in a sub-picture may refer to different adaptation parameter sets by using identifiers of the respective adaptation parameter sets.

Regarding the adaptation parameter sets, tiles or bricks in a slice may refer to different adaptation parameter sets by using identifiers of the respective adaptation parameter sets.

Regarding the adaptation parameter sets, bricks in a tile may refer to different adaptation parameter sets by using identifiers of the respective adaptation parameter sets.

The parameter set or header of a sub-picture may include information on an adaptation parameter set identifier. Thus, an adaptation parameter set corresponding to the adaptation parameter set identifier may be used in the sub-picture.

The parameter set or header of a tile may include an adaption parameter set identifier so that an adaption parameter set corresponding to the adaption parameter set identifier may be used in the tile.

The header of a brick may include information on an adaptation parameter set identifier so that an adaptation parameter set corresponding to the adaptation parameter set identifier may be used in the brick.

The picture may be split into one or more tile rows and one or more tile columns.

The sub-picture in a picture may be split into one or more tile rows and one or more tile columns. The sub-picture may be a rectangular or square region in a picture and may include one or more CTUs. The sub-picture may include at least one tile, brick, and/or slice.

The tile may be a rectangular or square region in a picture and may include one or more CTUs. The tile may be split into one or more bricks.

The brick may refer to one or more CTU rows in a tile. The tile may be split into one or more bricks, and each brick may have at least one CTU row. A tile that is not split into two or more bricks may also mean a brick.

The slice may include one or more tiles in a picture and may include one or more bricks in a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
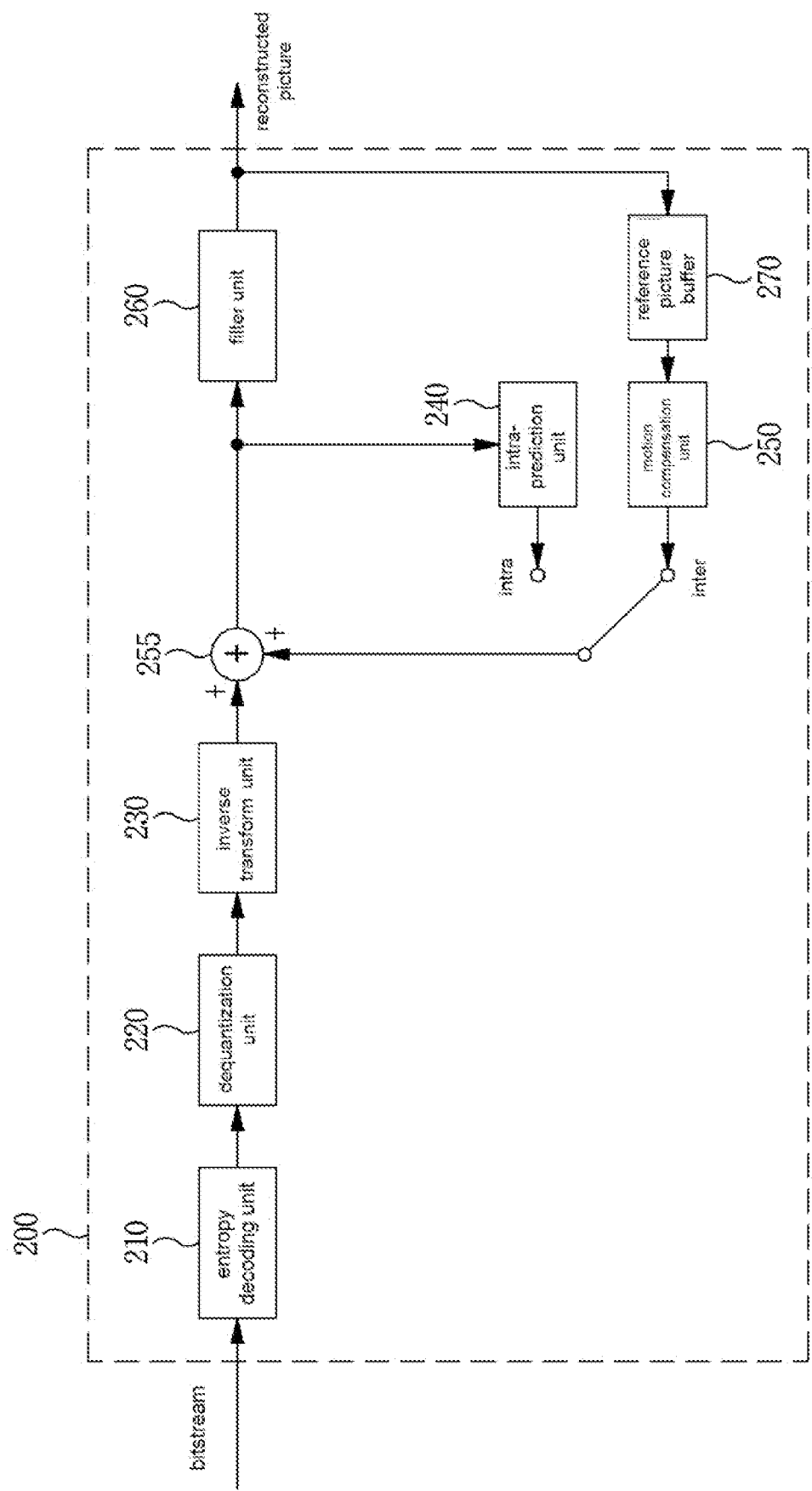
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
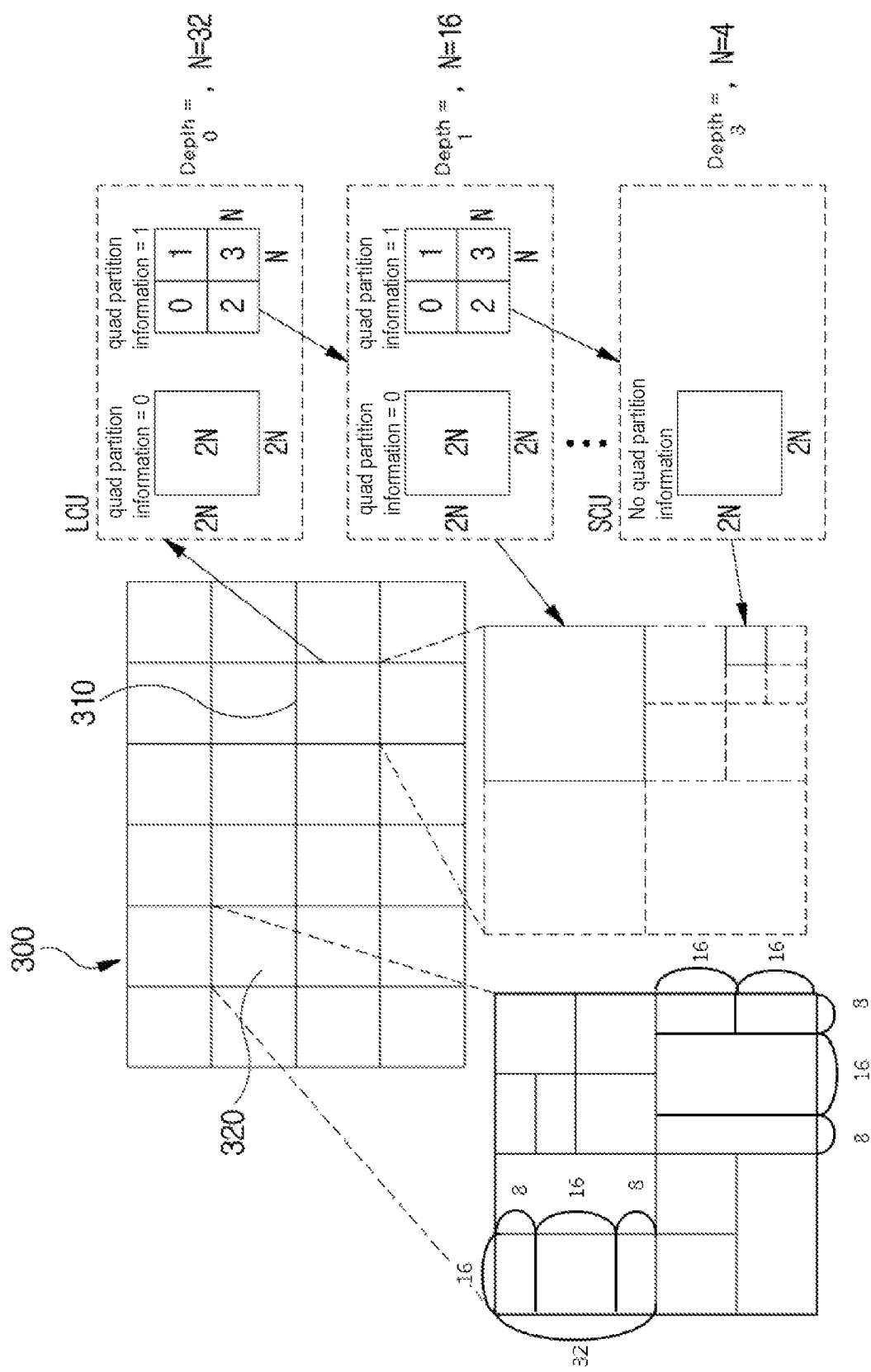
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
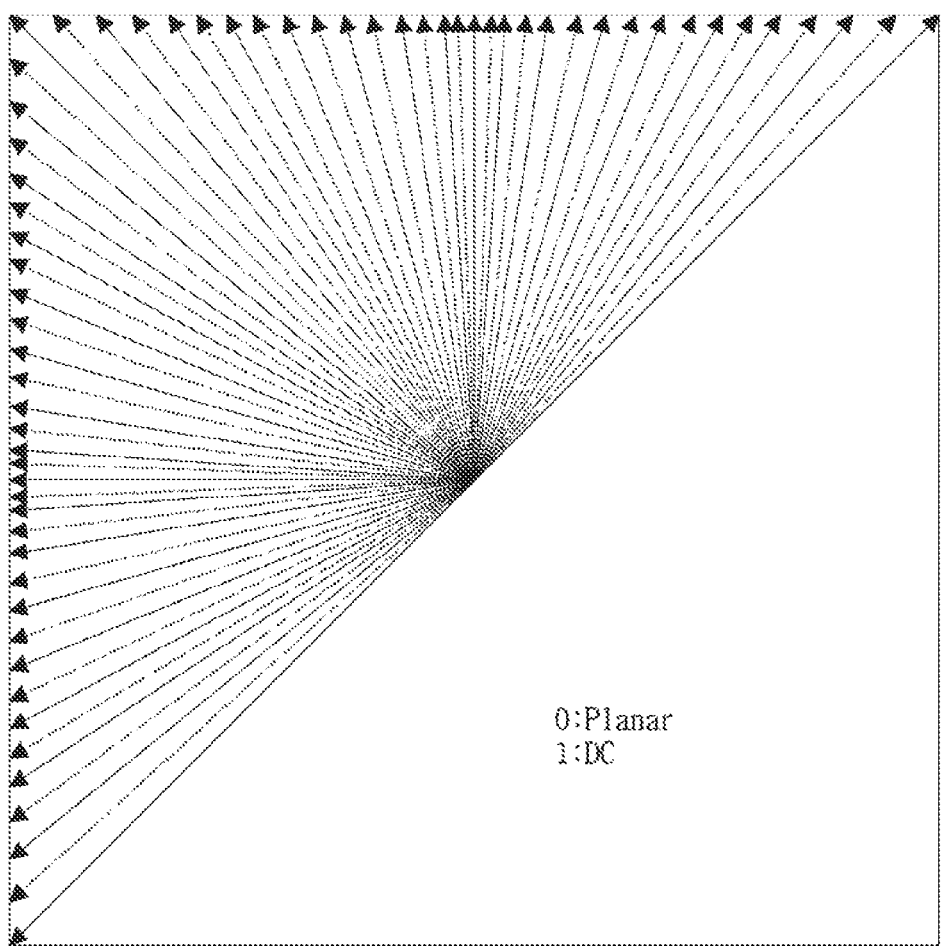
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
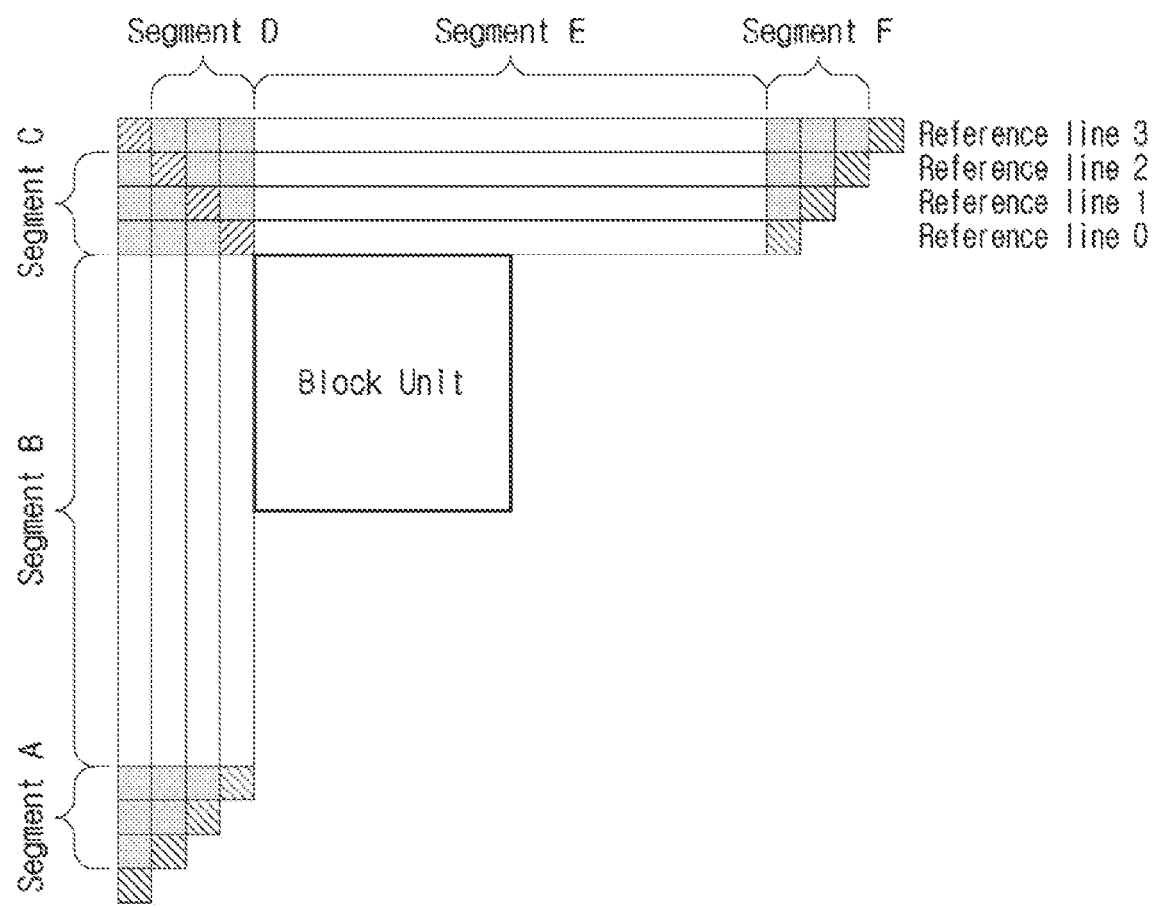
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
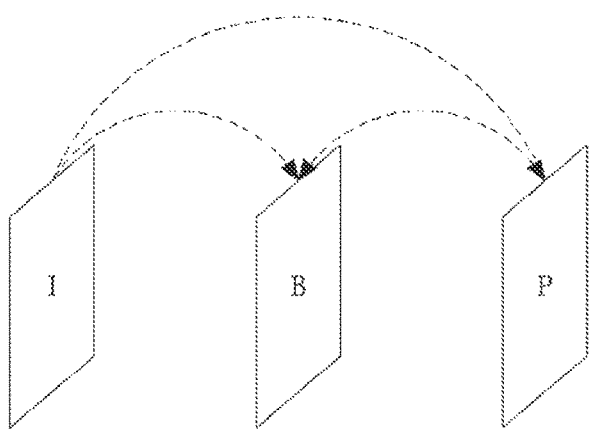
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
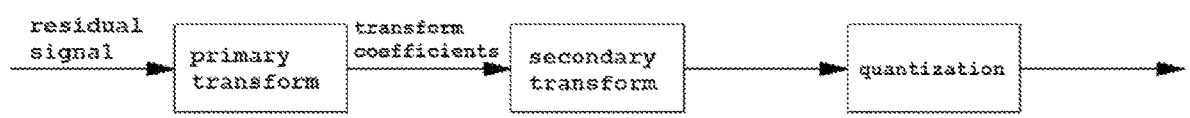
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

According to an embodiment of the present invention, a method of encoding/decoding a picture (i.e., image) using a candidate list will be described in detail below.

The picture may be encoded/decoded according to at least one of the following embodiments or at least one combination of the following embodiments. According to the following embodiment, the encoding efficiency of an image encoder and the decoding efficiency of an image decoder may be improved by efficiently deciding a reference block for a current block in an image encoding/decoding process.

Figure 8:
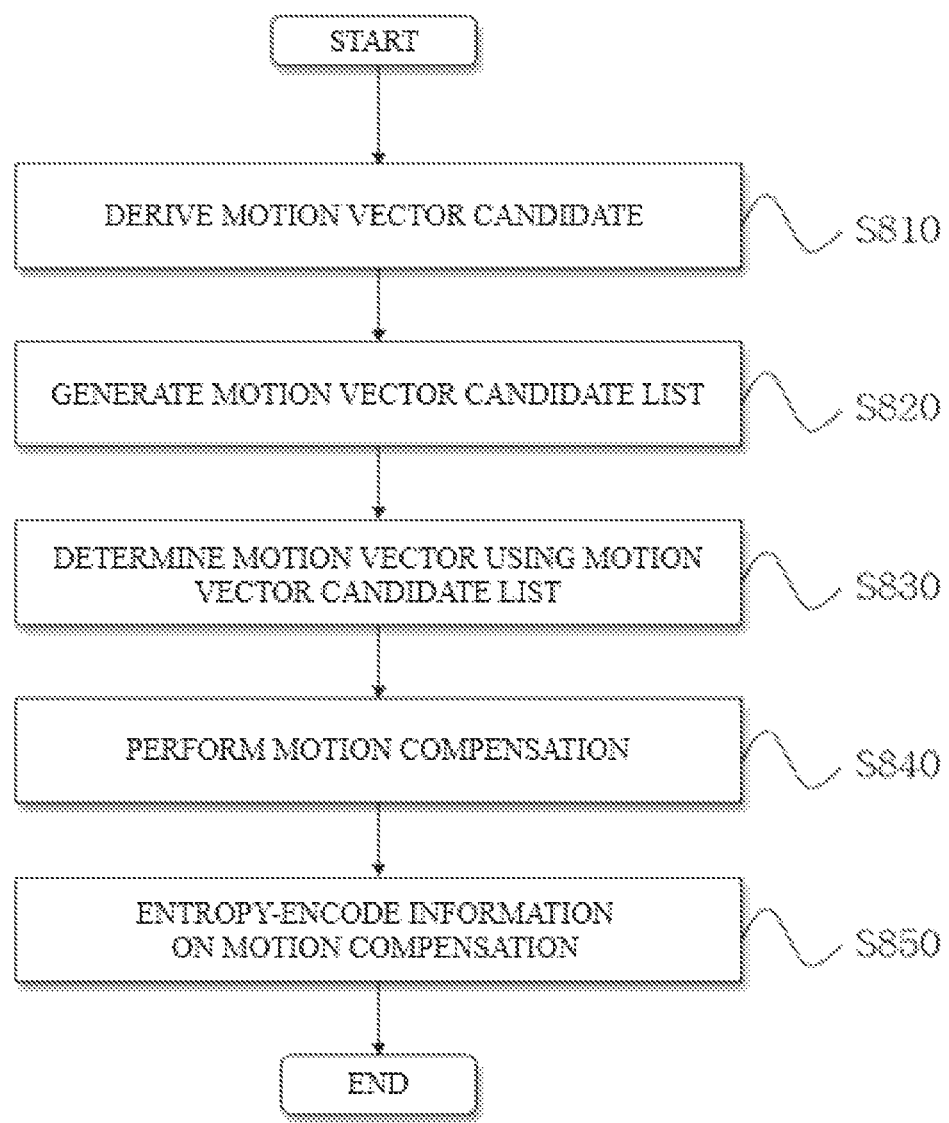
FIG. 8 is a flowchart illustrating an image encoding method according to an embodiment of the present invention.
Figure 9:
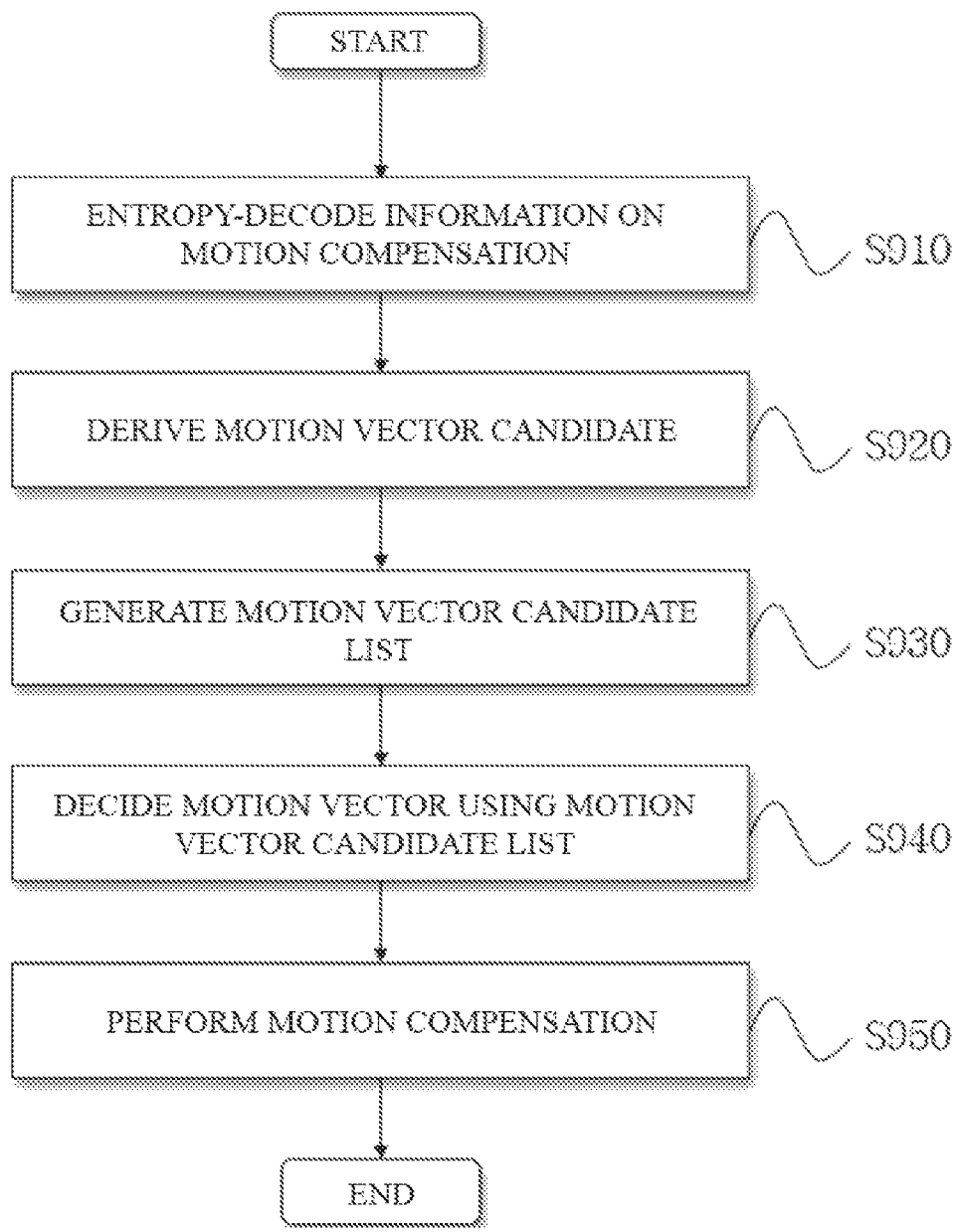
FIG. 9 is a flowchart illustrating an image decoding method according to an embodiment of the present invention.

FIG. 8 is a flowchart illustrating an image encoding method according to an embodiment of the present invention. FIG. 9 is a flowchart illustrating an image decoding method according to an embodiment of the present invention.

With reference to FIG. 8, an encoding apparatus may derive a motion vector candidate (S810), and, on the basis of the derived motion vector candidate, may generate a motion vector candidate list (S820). When the motion vector candidate list is generated, a motion vector may be determined using the generated motion vector candidate list (S830), and motion compensation may be performed using the determined motion vector (S840). Thereafter, the encoding apparatus may entropy-encode information on the motion compensation (S850).

With reference to FIG. 9, a decoding apparatus may entropy-decode the information on the motion compensation, which is received from the encoding apparatus (S910) and may derive the motion vector candidate (S920). Then, the decoding apparatus may generate the motion vector candidate list on the basis of the derived motion vector candidate (S930) and may decide the motion vector using the generated motion vector candidate list (S940). Thereafter, the decoding apparatus may perform the motion compensation using the determined motion vector (S950).

In FIGS. 8 and 9, the motion vector candidate with respect to the current block may mean a merge candidate with respect to the current block, and generation of the motion vector candidate list on the basis of the derived motion vector candidate may mean generation of a merge candidate list on the basis of the derived merge candidate.

Steps that are illustrated in FIGS. 8 and 9 will be described in detail below.

First, a step of deriving the motion vector candidate is described specifically (S810 and S920).

The motion vector candidate with respect to the current block may include at least one of a spatial motion vector candidate and a temporal motion vector candidate.

A spatial motion vector of the current block may be derived from a reconstructed block in the neighborhood of the current block. As an example, a motion vector of the reconstructed block in the neighborhood of the current block may be decided as a spatial motion vector candidate with respect of the current block.

Figure 10:
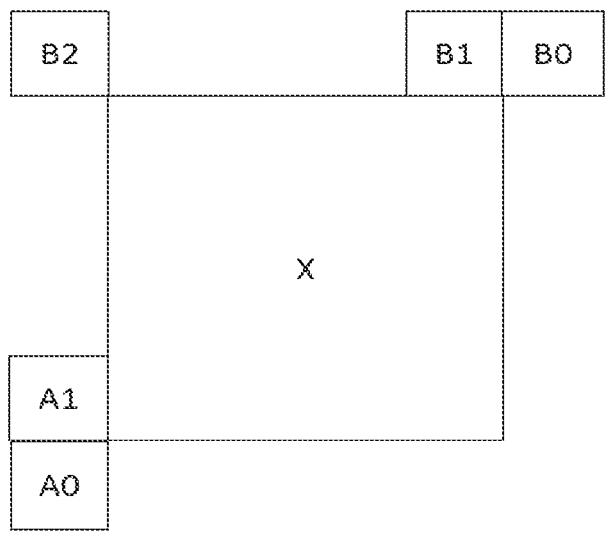
FIG. 10 is a diagram for describing an example of deriving a spatial motion vector candidate with respect to a current block.

FIG. 10 is a diagram for describing an example of deriving the spatial motion vector candidate with respect to the current block.

With reference to FIG. 9, the spatial motion vector candidate with respect to the current block may be derived from neighboring blocks adjacent to a current block X. At this point, the neighboring blocks adjacent to the current block may include at least one of a block (B1) adjacent to the upper of the current block, a block (A1) adjacent to the left side of the current block, a block (B0) adjacent to the upper right corner of the current block, a block (B2) adjacent to the upper left corner of the current block, and a block (A0) adjacent to the lower left corner of the current block.

Whether or not a motion vector with respect to the neighboring block is present, or whether or not the motion vector with respect to the neighboring block is available as the spatial motion vector candidate with respect to the current block may be determined on the basis of whether or not a neighboring block is present, whether or not a neighboring block is decoded through inter prediction, or the like. At this time, whether or not the motion vector with respect to the neighboring block is present, or whether or not the motion vector with respect to the neighboring block is available as the spatial motion vector candidate with respect to the current block may be decided according to given priority. As an example, in an example that is illustrated in FIG. 9, it may be determined whether or not motion vectors of blocks positioned at A0, A1, B0, B1, and B2 in this order are present.

In a case where a reference picture of the current block and a reference picture of the neighboring block having the motion vector are different from each other, a vector that results from scaling the motion vector with respect to the neighboring block may be decided as the spatial motion vector candidate with respect to the current block. At this point, the scaling may be performed on the basis of at least one of a distance between a current picture and the reference picture that is referred to by the current block and a distance between the current picture and the reference picture that is referred to by the neighboring block. As an example, the spatial motion vector candidate with respect to the current block may be derived by scaling the motion vector with respect to the neighboring block according to a ratio between the distance between the current picture and the reference picture that is referred to by the current block and the distance between the current picture and the reference picture that is referred to by the neighboring block.

In addition, in a case where a reference picture index of the current block and a reference picture index of the neighboring block having the motion vector are different from each other, a vector that results from scaling the motion vector with respect to the neighboring block may be decided as the spatial motion vector candidate with respect to the current block. In this case, the scaling may also be performed on the basis of at least one of the distance between the current picture and the reference picture that is referred to by the current block and the distance between the current picture and the reference picture that is referred to by the neighboring block.

Regarding the scaling, the motion vector with respect to the neighboring block may be scaled on the basis of the reference picture that is indicated by the reference picture index having a predefined value, and thus the resulting vector may be decided as the spatial motion vector candidate. At this time, the predefined value may be 0 or a positive integer. As an example, the motion vector with respect to the neighboring block may be scaled according to a ratio between a distance between the current picture and the reference picture of the current block that is indicated by the reference picture index having a predefined value, and a distance between the current picture and the reference picture of the neighboring block having a predefined value, and thus the spatial motion vector candidate with respect to the current block may be derived.

In addition, the spatial motion vector candidate with respect to the current block may be derived on the basis of at least one or more of the coding parameters of the current block.

In addition, the derivation of the spatial motion vector candidate according to the present invention may mean derivation of a spatial merge candidate with respect to the current block using motion information of the neighboring block.

A temporal motion vector candidate with respect to the current block may be derived from a reconstructed block included in a picture collocated with the current picture. At this point, the collocated picture may be a picture that is encoded/decoded earlier than the current picture and may be a picture that is in different time sequence than the current picture.

Figure 11:
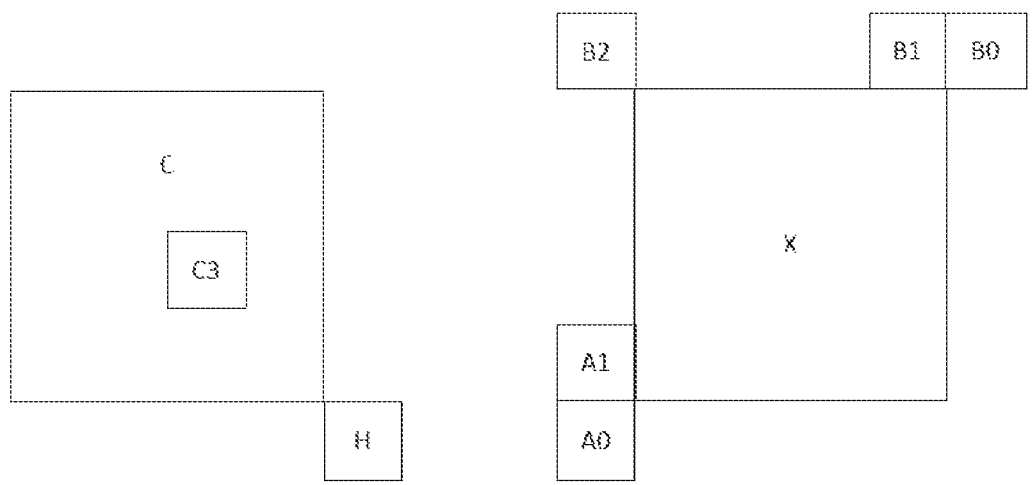
FIG. 11 is a diagram for describing an example of deriving a temporal motion vector candidate with respect to the current block.

FIG. 11 is a diagram for describing an example of deriving the temporal motion vector candidate with respect to the current block.

With reference to FIG. 11, in a picture that is collocated with the current picture, the temporal motion vector candidate with respect to the current block may be derived from a block including an external position of a block that is collocated spatially with the current block X, or a block including an internal position of a block that is collocated spatially with the current block X. At this point, the temporal motion vector candidate may mean a motion vector of a collocated bock. As an example, a temporal motion vector candidate with respect to the current block X may be derived from a block H adjacent to the lower right corner of a block C that is collocated spatially with the current block, or a block C3 including the center point of the block C. The block H, the block C3, or the like that is used in order to derive the temporal motion vector candidate with respect to the current block may be referred to as "collocated block".

In addition, at least one of the temporal motion vector candidate, the collocated picture, the collocated block, the prediction list utilization flag, and the reference picture index may be derived on the basis of at least one or more of the coding parameters.

In a case where a distance between the current picture including the current block and the reference picture of the current block is different from a distance between the collocated picture including the collocated block and the reference picture of the collocated block, the temporal motion vector candidate with respect to the current block may be acquired by scaling the motion vector with respect to the collocated block. At this point, the scaling may be performed on the basis of at least one of the distance between the current picture and the reference picture that is referred to by the current block, and a distance between the collocated picture and the reference picture that is referred to by the collocated block. As an example, the motion vector with respect to the collocated bock may be scaled according to a ratio between the distance between the current picture and the reference picture that is referred to by the current block and the distance between the collocated picture and the reference picture that is referred to by the collocated block, and thus the temporal motion vector candidate with respect to the current block may be derived.

In addition, the derivation of the temporal motion vector candidate according to the present invention may mean the derivation of a temporal merge candidate with respect to the current block using motion information of the collocated block.

A method of deriving a history-based motion vector candidate that may be an example of the motion vector candidate according to the present invention will be described below. In the following description, the candidate list may refer to a list including the history-based motion vector candidate described above. In addition, in the following description, the candidate list may be defined as a history-based merge candidate list.

Figure 12:
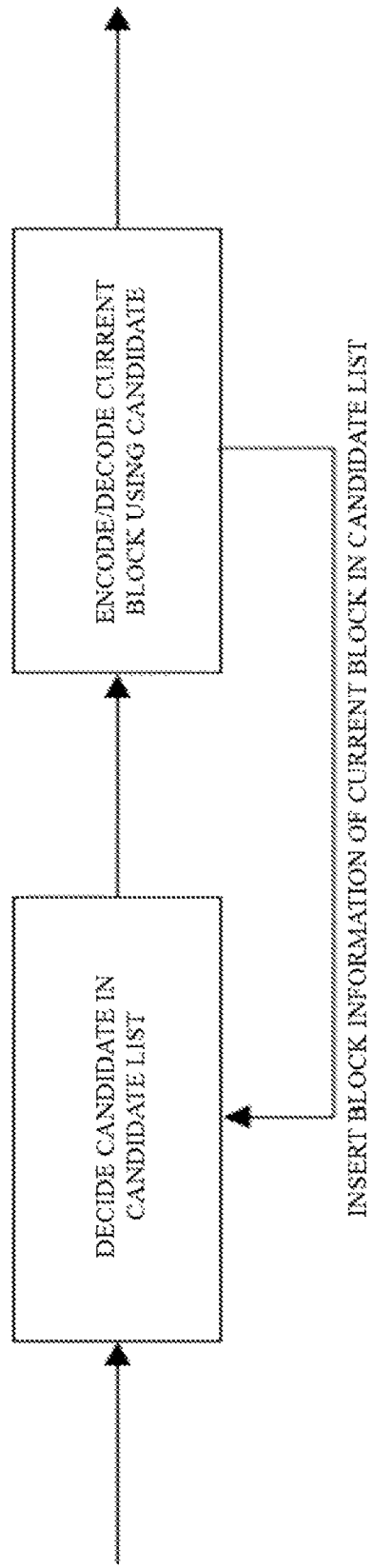
FIG. 12 is a diagram for describing an example of deriving a candidate list according to an embodiment of the present invention.

FIG. 12 is a diagram for describing an example of deriving the candidate list according to an embodiment of the present invention.

At least one of the pieces of block information of the current block, which are used in the encoding or decoding process or are generated after the encoding or decoding process, may be added to or included in the candidate list.

At this point, the information of the block may be at least one of the coding parameters, such as the intra prediction mode, the motion vector, and the motion information.

As an example, at least one of the pieces of block information of the current block may be included in the candidate list only in a case where the current block is not in a affine mode, or where a subblock-based temporal motion vector derivation mode is not applied.

The candidate list according to the present invention may be maintained while encoding/decoding is performed per picture, per subpicture, per slice, per tile, per brick, per CTU boundary, per CTU row, and per CTU column, and may be used per picture, per subpicture, per slice, per tile, per brick, per CTU boundary, per CTU row, and per CTU column. In addition, the candidate list according to the present invention may include at least one of the pieces of block information of a block, which are previously encoded/decoded based on the current block, within the unit of picture, subpicture, slice, tile, brick, CTU boundary, CTU row, and CTU column. In addition, the candidate list according to the present invention may include at least one of the pieces of block information, which are encoded/decoded earlier per picture, per subpicture, per slice, per tile, per brick, per CTU boundary, per CTU row, and per CTU column. A candidate list in the following description may mean the candidate list according to the present invention, which is described above.

As illustrated in FIG. 12, the candidate list or at least one of pieces of block information of a candidate in the merge candidate list may be decided or selected in order to be used in a process of encoding/decoding the current block. Thus, the process of encoding/decoding the current block may be performed using at least one of the pieces of block information of the decided candidate.

At this time, at least one of the pieces of block information that are used in the process of encoding/decoding the current block, or at least one of pieces of block information of the current block, which are generated after the process of encoding/decoding the current block, may be added to or included in the candidate list. In the following description, the addition of at least one of the block information, the candidate, and the block to the candidate list may be interpreted to have the same meaning as the inclusion of at least one of the block information, the candidate, and the block in the candidate list.

As an example, when at least one of the pieces of block information of the current block is included in the candidate list, at least one of the pieces of block information of the current block may be added, as a first or last entry, to the candidate list. In addition, the block information may be added so that the block information is at a pre-defined position between an encoder and a decoder in the candidate list, and may be added so that the block information is at an arbitrary position that is signaled from the encoder to the decoder.

As another example, the maximum number of the candidates in the candidate list may be taken into consideration when at least one of the pieces of block information of the current block is included in the candidate list. In a case where the number of the candidates that are included in the candidate list is the maximum number of the candidates, the block information of the current block may not be included in the candidate list.

For example, the maximum number of the candidates in the candidate list may be decided as P. At this point, P may be 0 or a positive integer. As an example, P may be 5 and may be decided on the basis of at least one of the coding parameter of the current block and the coding parameter of the candidate. In addition, P may be a value that is pre-defined in the encoder/decoder and may be a value that is signaled from the encoder to the decoder.

As still another example, in a case where the number of the candidates that are included in the candidate list is the maximum number of the candidates, the candidate that is earliest included in the candidate list, of the candidates that are included in the candidate list is deleted, and the block information of the current block is included in next order of the candidate that are latest included in the candidate list.

A candidate in the candidate list according to the present invention may be added to or included in at least one of an intra prediction mode candidate list, a primary most probable mode (MPM), a secondary MPM list, the residual intra prediction mode candidate list, the motion vector candidate list, and the merge candidate list.

At this point, the primary MPM list may be the intra prediction mode candidate list that includes at least one of an intra prediction mode of a spatial neighboring block, a derived intra prediction mode (derived mode) that results from subtracting or adding a specific value from or to the intra prediction mode of the spatial neighboring block, and a basic intra prediction mode. At this time, the basic intra prediction mode may be at least one of a DC mode, a planar mode, a vertical mode, and a horizontal mode. The specific value may be at least one of 0, a positive integer, and a negative integer. The specific value may be decided on the basis of at least one of the coding parameter of the current block and the coding parameter of the candidate. In addition, the specific value may be a value that is pre-defined in the encoder/decoder and may be a value that is signaled from the encoder to the decoder.

The secondary MPM list may be an intra prediction mode candidate list that is made up of intra prediction modes which are not in the primary MPM list. In a case where in the current block, a candidate in the primary MPM list is not determined as the intra prediction mode, a candidate in the secondary MPM list may be decided as the intra prediction mode.

Regarding the residual intra prediction mode candidate list, in a case where in the current block, a candidate that is included in at least one of the primary MPM list and the secondary MPM list is not decided as the intra prediction mode, a candidate in the residual intra prediction mode candidate list may be decided as the intra prediction mode.

Therefore, the intra prediction mode candidate list may mean at least one of the primary MPM list, the secondary MPM list, and the residual intra prediction mode candidate list.

Coding information on the inter prediction, of pieces of information of the current block may be included in the candidate list. The candidate in the candidate list including the coding information including may be used as a candidate when making up the motion vector candidate list or the merge candidate list. That is, the candidate in the candidate list may be included in or added to the motion vector candidate list or the merge candidate list. At this point, the coding information on the inter prediction may include at least one of the motion vector, a reference picture index, and reference picture list information.

The derivation of the history-based motion vector candidate according to the present invention may mean the derivation of the history-based merge candidate using motion information of the current block.

For example, the derivation of the history-based motion vector candidate may mean the derivation of the history-based motion vector candidate list or the history-based merge candidate list including the history-based motion vector candidates.

Figure 13:
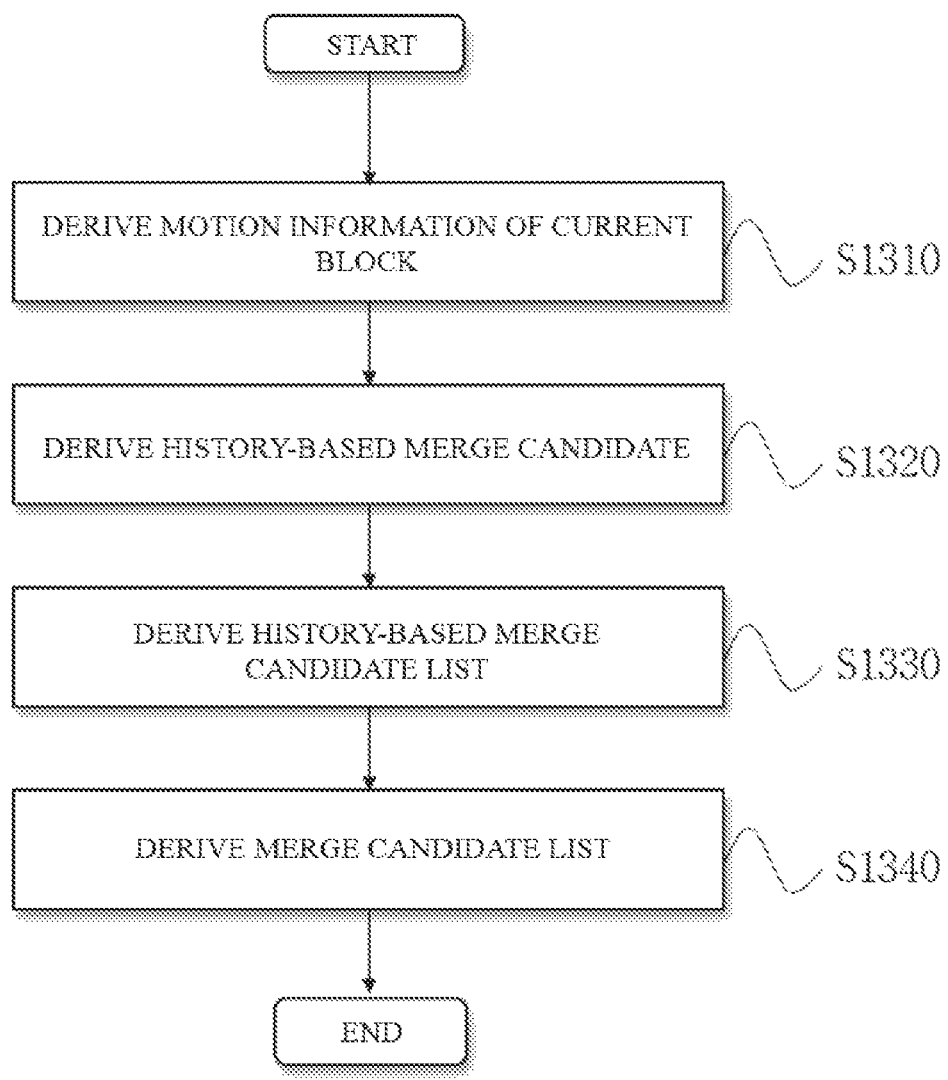
FIG. 13 is a flowchart for describing a method of deriving the candidate list according to an embodiment of the present.

FIG. 13 is a flowchart for describing the method of deriving a candidate list according to an embodiment of the present invention.

With reference to FIG. 13, a method of encoding or decoding a picture according to the present invention includes a step of deriving motion information of a current block (S1310), a step of deriving a history-based merge candidate using the motion information of the current block (S1320), a step of deriving a history-based merge candidate list using the history-based merge candidate (S1330), and a step of deriving a merge candidate list using the history-based merge candidate (S1340).

Step S1330 may be a step of adding the history-based merge candidate derived in S1320 to the history-based merge candidate list.

In addition, the merge candidate list in Step S1340 may be used for inter prediction of a block that is encoded/decoded after the current block.

As another example, a method of encoding or decoding a picture according to the present invention includes a step of deriving motion information of a current block, a step of deriving a history-based merge candidate using the motion information of the current block, a step of deriving a motion vector candidate using the history-based merge candidate, and a step of deriving a motion vector candidate list using the history-based merge candidate.

The step of deriving the motion vector candidate list may be a step of adding the derived history-based merge candidate to a history-based motion vector candidate list.

At this time, the derived motion vector candidate list may be used for inter prediction of a block that is encoded/decoded after the current block.

Next, a step of generating the motion vector candidate list or a merge candidate list on the basis of the derived motion vector candidate or the merge candidate is described (S820 and S930).

As an example, the step of generating the motion vector candidate list may include a step of adding or removing the motion vector candidate to or from the motion vector candidate list and a step of adding a combined motion vector candidate to the motion vector candidate list.

As another example, the step of generating the motion vector candidate list may include a step of adding or removing the derived merge candidate to or from the merge candidate list and a step of adding the combined motion vector candidate to the merge candidate list.

The encoding apparatus and the decoding apparatus may add the derived motion vector candidate to the motion vector candidate list or the merge candidate list in the order in which motion vector candidates are derived.

A motion vector candidate list mvpListLX may mean the motion vector candidate list that corresponds to reference picture lists L0, L1, L2, and L3. For example, the motion vector candidate list that corresponds to L0 may be referred to as mvpListL0.

The motion vector candidate with respect to the current block list may be configured using one of the following embodiments.

As an example, the spatial motion vector candidates, the temporal motion vector candidate, and at least one of the candidates in the history-based motion vector candidate list may be added to the motion vector candidate list in the order of derivation.

As another example, the derived spatial merge candidates, the temporal merge candidate, and at least one of the candidates in the history-based motion vector candidate list may be sequentially added to the merge candidate list.

As still another example, the motion vector candidates in this order, the derived spatial motion vector candidates, at least one of the candidates in the history-based motion vector candidate list, the temporal motion vector candidate may be added to the motion vector candidate list.

As still another example, the merge candidates in this order, the derived spatial merge candidate, at least one of the candidates in the history-based merge candidate list, the temporal merge candidates may be added to the merge candidate list.

As still another example, at least one of the candidates in the history-based motion vector candidate list may be added between the derived spatial motion vector candidates, and then the temporal motion vector candidate may be added to the motion vector candidate list. For example, the motion vector candidates in this order: N spatial motion vector candidates, at least one of the candidates in the history-based motion vector candidate list, M spatial motion vector candidates, the temporal motion vector candidates may be added to the motion vector candidate list. At this time, N and M may be integer valued that are greater than 0.

As still another example, at least one of the candidates in the history-based merge candidate list may be added between the derived spatial merge candidates, and then the temporal merge candidate may be added to the merge candidate list. For example, the merge candidates in this order: N spatial merge candidates, at least one of the candidates in the history-based merge candidate list, M spatial merge candidates, the temporal merge candidates may be added to the merge candidate list. At this time, N and M may be integer valued that are greater than 0.

As still another example, the spatial motion vector candidates, the temporal motion vector candidates, and at least one of the candidates in the history-based motion vector candidate list may be added to the motion vector candidate list in an arbitrary order that is determined in advance.

As still another example, the spatial merge candidates, the temporal merge candidates, and at least one of the candidates in the history-based merge candidate list may be added to the merge candidate list in an arbitrary order that is determined in advance.

The arbitrary order at this time may be decided on the basis of at least one of the coding parameter of the current block and the coding parameter of the candidate. In addition, the arbitrary order may be an order that is pre-defined in the encoder/decoder and may be decided according to a value that is signaled from the encoder to the decoder.

As still another example, other than the derived spatial motion vector candidate, at least one of the candidates in the history-based motion vector candidate list, and the temporal motion vector candidate, a vector having a given value may be added to the motion vector candidate list.

As still another example, other than the derived spatial merge candidate, at least one of the candidates in the history-based merge candidate list, and the temporal merge candidate, motion information having a given value may be added to the merge candidate list.

For example, the motion information having a given value may be a zero (0) motion vector or a zero (0) merge candidate.

Next, a step of adding the combined motion vector candidate to the motion vector candidate list is described.

As an example, the encoder or the decoder may generate a motion vector candidate that is combined using at least one or more of the spatial motion vector candidate present in the motion vector candidate list, at least one of the candidates in the history-based motion vector candidate list, the temporal motion vector candidate, and a zero motion vector candidate, and may add the generated combined motion vector candidate to the motion vector candidate list.

As another example, the encoder or the decoder may generate a merge candidate that is combined using at least one or more of the spatial merge candidates present in the merge candidate list, at least one of the candidates in the history-based merge candidate list, the temporal merge candidates, and the zero merge candidate, and may add the generated combined merge candidate to the merge candidate list.

The combined motion vector candidate or the merge candidate may be generated on the basis of at least one or more of the coding parameters. In addition, the combined motion vector candidate or the merge candidate may be added to the motion vector candidate list or the merge candidate list on the basis of at least one or more of the coding parameters.

Next, a step of determining a motion vector predicted from the motion vector candidate list is described (S830 and S940).

As an example, the motion vector candidate that is indicated by a motion vector candidate index, of the motion vector candidates included in the motion vector candidate list, may be decided as the predicted motion vector with respect to the current block.

The encoding apparatus may calculate a difference between the motion vector and the predicted motion vector and thus may calculate a motion vector difference value. The decoding apparatus may add up the predicted motion vector and a motion vector difference and thus may calculate the motion vector.

As another example, the merge candidate that is indicated by a merge candidate index, of the merge candidates included in the merge candidate list may be decided as a merge candidate for motion compensation with respect to the current block.

Next, a step of performing the motion compensation using the motion vector or the motion information is described (S840 and S950).

The encoder and the decoder may perform inter-prediction or motion compensation by using a determined merge candidate. Herein, an encoding/decoding target block may include motion information of the determined merge candidate.

When an encoding/decoding target block includes at least one or up to N motion vectors/information, the encoder and the decoder may generate at least one or up to N prediction blocks by using the at least one or up to N motion vectors/information among the corresponding motion vectors/information, and use as a final prediction block of the encoding/decoding target block In an example, when an encoding/decoding target block includes one motion vector/information, the encoder and the decoder may generate a prediction block by using the corresponding motion vector/information, and use the generated prediction block as a final prediction block of the encoding/decoding target block.

In another example, when an encoding/decoding target block includes two motion vectors/information, the encoder and the decoder may generate prediction blocks by using two motion vectors/information, and derive a prediction block by a weighted sum of prediction blocks so as to use as a final prediction block of the encoding/decoding target block. Herein, a weighting factor applied to each prediction block may be ½.

In another example, when an encoding/decoding target block includes three motion vectors/information, the encoder and the decoder may generate prediction blocks by using three motion vectors/information, and derive a prediction block by a weighted sum of three prediction blocks so as to use as a final prediction block of the encoding/decoding target block. Herein, a weighting factor applied to each prediction block may be ⅓.

In another example, when an encoding/decoding target block includes four motion vectors/information, the encoder and the decoder may generate prediction blocks by using four motion vectors/information, and derive a prediction block by a weighted sum of four prediction blocks so as to use as a final prediction block of the encoding/decoding target block. Herein, a weighting factor applied to each prediction block may be ¼.

The above-described weighting factor is not limited to a fixed value, and may be a variable value. A weighting factor applied to each prediction block may be identical or different from each other. In order to apply a variable weighting factor, at least one piece of weighting factor information may be signaled for the decoding target block through a bitstream. Weighting factor information may be signaled for each prediction block, or may be signaled for each reference image. A plurality of prediction blocks may share one piece of weighting factor information.

When a prediction block list utilization flag is a first value, an encoding/decoding target block may use the corresponding motion information. In addition, when a prediction block list utilization flag is a second value, an encoding/decoding target block may not use the corresponding motion information In an example, when an encoding/decoding target block possibly uses two pieces of motion information or when an inter-prediction indicator is PRED_BI, a weighted sum of prediction blocks may be calculated according to Equation 1 below.

$$P\_BI=(WF\_L0*P\_L0+OFFSET\_L0+WF\_L1*P\_L1+OFFSET\_L1+R\ F)>>1 \quad \text{[Equation 1]}$$

In an example, when an encoding/decoding target block possibly uses three pieces of motion information or when an inter-prediction indicator is PRED_TRI, a weighted sum of prediction blocks may be calculated according to Equation 2 below.

$$P\_TRI=(WF\_L0*P\_L0+OFFSET\_L0+WF\_L1*P\_L1+OFFSET\_L1+WF\_L2*P\_L2+OFFSET\_L2+RF)/3 \quad \text{[Equation 2]}$$

In an example, when an encoding/decoding target block possibly uses four pieces of motion information or when an inter-prediction indicator is PRED_QUAD, a weighted sum of prediction blocks may be calculated according to Equation 3 below.

$$P\_QUAD=(WF\_L0*P\_L0+OFFSET\_L0+WF\_L1*P\_L1+OFFSET\_L\ 1+WF\_L2*P\_L2+OFFSET\_L2+WF\_L3*P\_L3+OFFSET\_L3+RF)>>2 \quad \text{[Equation 3]}$$

In the above equations, each of P_BI, P_TRI, and P_QUAD may be a final prediction block of the encoding/decoding target block, each of WF_L0, WF_L1, WF_L2, and WF_L3 may be a weighting factor value for each prediction block, each of OFFSET_L0, OFFSET_L1, OFFSET_L2, and OFFSET_L3 may be an offset value for each prediction block, and P_L0, P_L1, P_L2, and P_L3 may mean prediction blocks respectively generated by using L0 to L3 motion vectors/information of the encoding/decoding target block. RF may mean a rounding factor, and have a positive or negative integer value including 0. In addition, L0 may mean a reference image list 0, L1 may mean a reference image list 1, L2 may mean a reference image list 2, and L3 may mean a reference image list 3.

Herein, at least one of an L2 reference image list and an L3 reference image list may include at least one of a long-term reference image, a reference image on which deblocking filter is not performed, a reference image on which sample adaptive offset is not performed, a reference image on which adaptive loop filter is not performed, a reference image on which deblocking filter and sample adaptive offset are only performed, a reference image on which deblocking filter and adaptive offset are only performed, and a reference image on which sample adaptive offset and adaptive offset are only performed.

When an encoding/decoding target block includes at least two motion vectors/information, the encoder and the decoder may generate prediction blocks by using two motion vectors/information, and calculate a weighted sum of the prediction blocks. When calculating a weighted sum of prediction blocks, at least one of a weighting factor and an offset for each prediction block which is used for calculating a weighted sum may be used by entropy encoding/decoding.

In addition, the encoder and the decoder may not entropy encode/decode at least one of weighting factor information and offset information, and use at least one of encoded/decoded weighting factor and offset values of a neighbor block as at least one of a weighting factor and an offset for each prediction block.

In addition, the encoder and the decoder may not entropy encode/decode at least one of weighting factor information and offset information, and calculate the same on the basis of a current image to which an encoding/decoding target block belongs, and a POC of each reference image. The encoder and the decoder may use at least one of a small weighting factor value and a small offset value when a distance between a current image and a reference image becomes large, and use at least one of a large weighting factor value and a large offset value when a distance between a current image and a reference image becomes small. For example, the encoder and the decoder may calculate a weighting factor value as ⅓ when a POC difference between a current image and an L0 reference image is 2, and calculate a weighting factor value as ⅔ when a POC difference between a current image and an L0 reference image is 1. In other words, the encoder and the decoder may calculate a weighting factor value for each prediction block in inverse proportion to the POC difference.

In addition, the encoder and the decoder may entropy encode/decode at least one of weighting factor information and offset information on the basis of at least one coding parameter. In addition, the encoder and the decoder may calculate a weighted sum of prediction blocks on the basis of at least one coding parameter.

The weighted sum of prediction blocks may be applied to a partial region within the prediction block. For example, a partial region may be a region corresponding to a boundary of the prediction block. In addition, a weighted sum of prediction blocks may be calculated on the basis of a sub-block.

The inter prediction or the motion compensation may be performed on subblocks of the current block having a specific block size that is indicated by the block information, using the same prediction block or the same final prediction block.

In addition, the inter prediction or the motion compensation may be performed on the subblocks of the current block having a specific block depth that is indicated by the block information, using the same prediction block or the same final prediction block.

In addition, when calculating a weighted sum of prediction blocks using motion vector prediction, the encoder and the decoder may calculate the weighted sum of the prediction blocks that are generated using at least one or more of the motion vector candidates present in the motion vector candidate list, and may use the calculated weighted sum as a final prediction block for an encoding/decoding-target block.

As an example, the encoder and the decoder may generate the prediction blocks, only using the spatial motion vector candidates and may calculate the weighted sum of the prediction blocks. The encoder and the decoder may use the calculated weighted sum as the final prediction block for the encoding/decoding-target block.

As another example, the encoder and the decoder may generate the prediction blocks using the spatial motion vector candidate and the temporal motion vector candidates, and may calculate the weighted sum of the prediction blocks. The encoder and the decoder may use the calculated weighted sum as the final prediction block for the encoding/decoding-target block.

As still another example, the encoder and the decoder may generate the prediction blocks, only using the combined motion vector candidates, and may calculate the weighted sum of the prediction blocks. The encoder and the decoder may use the calculated weighted sum as the final prediction block for the encoding/decoding-target block.

As still another example, the encoder and the decoder may generate the prediction blocks only using the motion vector candidates that have specific motion vector candidate indexes, and may calculate the weighted sum of the prediction blocks. The encoder and the decoder may use the calculated weighted sum as the final prediction block for the encoding/decoding-target block.

In addition, the calculation may be performed. The calculated weighted sum may be used as the final prediction block for the encoding/decoding-target block.

In addition, when calculating the weighted sum of the prediction blocks using the merge mode, the encoder and the decoder may calculate the weighted sum using at least one or more of the merge candidates present in the merge candidate list and may use the calculated weighted sum as the final prediction block for the encoding/decoding-target block.

That is, the encoder and the decoder may select at least one or more merge candidate indexes for selection of the merge candidate in order to select at least one or more merge candidates from among the merge candidates included in the merge candidate list. For example, for the calculation of the weighted sum, the encoder and the decoder may select two merge candidates of the merge candidates that are included in the merge candidate list. At this time, the encoder and the decoder may select two merge candidate indexes for selecting the two merge candidates.

As another example, the encoder and the decoder may generate the prediction blocks, only using the motion vector candidates present within a specific motion vector candidate index range and may calculate the weighted sum of the prediction blocks.

As an example, the encoder and the decoder may generate the prediction blocks, only using the spatial merge candidates and may calculate the weighted sum of the prediction blocks. The encoder and the decoder may use the calculated weighted sum as the final prediction block for the encoding/decoding-target block.

As another example, the encoder and the decoder may generate the prediction blocks, only using the spatial merge candidate and the temporal merge candidates and may calculate the weighted sum of the prediction blocks. The encoder and the decoder may use the calculated weighted sum as the final prediction block for the encoding/decoding-target block.

As still another example, the encoder and the decoder may generate the prediction blocks, only using the combined merge candidates and may calculate the weighted sum of the prediction blocks. The encoder and the decoder may use the calculated weighted sum as the final prediction block for the encoding/decoding-target block.

As still another example, the encoder and the decoder may generate one or more prediction blocks using the merge candidates that are indicated by one or more merge candidate indexes and may calculate the weighted sum using the generated prediction blocks. The encoder and the decoder may use the calculated weighted sum as the final prediction block for the encoding/decoding-target block.

As still another example, the encoder and the decoder may generate the prediction blocks, only using the merge candidates present within a specific merge candidate index range and may calculate the weighted sum of the prediction blocks. The encoder and the decoder may use the calculated weighted sum as the final prediction block for the encoding/decoding-target block.

The encoder and the decoder may perform the motion compensation using motion vector/information that is retained by the current block. At this time, the final prediction block that results from the motion compensation may be generated using at least one or more prediction blocks. At this point, the current block may mean at least one or both of a current coding block and a current prediction block.

The encoder and the decoder may perform overlapped block motion compensation on a region that corresponds to an inner boundary of the current block and may generate the final prediction block.

The region that corresponds to the inner boundary of the current block may be an inner region of the current block adjacent to a boundary of a neighboring block of the current block. At this point, the inner boundary of the current block may include at least one or more of an upper boundary region, a left-side boundary region, a lower boundary region, a right boundary region, an upper right corner region, a lower right corner region, an upper left corner region, and a lower left corner region of the current block. In addition, a region that corresponds to the inner boundary of the current block may be a region that corresponds to one portion of the current block within the prediction block.

The overlapped block motion compensation may mean that the motion compensation is performed by calculating the weighted sum of the prediction blocks that are generated using a prediction block region corresponding to the inner boundary of the current block and motion information of a block, which is encoded/decoded in a manner that is adjacent to the current block.

In addition, in a case where the current block is partitioned into subblocks, the inner boundary of the current block may be a region adjacent to a boundary between the subblocks within the current block. For example, in a case where the current block is partitioned into regions in the shape of a triangle, regions that correspond to the inner boundary of the current block may be regions adjacent to a diagonal boundary that results from the triangle partitioning. The weighted sum may be calculated on a per-subblock-block basis after the current block is partitioned into many subblocks (subblocks). That is, the motion compensation may be performed using the motion information of the block, which is encoded/decoded on a per-subblock basis in a manner that is adjacent to the current block. At this time, a lower block may mean a subblock.

In addition, when calculating the weighted sum, a first prediction block that is generated on a per-subblock-block basis using the motion information of the current block, and a second prediction block that is generated using motion information of a neighboring subblock that is spatially adjacent to the current block may be used. At this time, the use of the motion information may mean the derivation of the motion information. Then, the first prediction block may mean a prediction block that is generated using motion information of a encoding/decoding-target subblock within the current block. In addition, the second prediction block here may mean a prediction block that is generated using the motion information of the neighboring subblock that is spatially adjacent to the encoding/decoding-target subblock within the current block.

In addition, for the calculation of the weighted sum, the encoder or the decoder may partition the current block into two or more subblocks and may generate a prediction block with respect to each subblock. For example, the encoder or the decoder may partition the current block into a first subblock and a second subblock and may generate the first prediction block with respect to the first subblock and the second prediction block with respect to the second subblock.

The final prediction block with respect to the current block may be generated using a weighted sum of the first prediction block and the second prediction block. That is, for the overlapped block motion compensation, the final prediction block may be generated using motion information of a different block in addition to the motion information of the current block.

In addition, in a case where at least one or more of an advanced motion vector prediction (AMVP) mode, a merge mode, a triangle partition mode, an affine motion compensation mode, a decoder-side motion vector derivation mode, an adaptive motion vector resolution mode, a local illumination compensation mode, and a bi-directional optical flow mode are enabled, the current block may be partitioned into subblocks and then the overlapped block motion compensation may be performed on a per-subblock-block basis.

As an example, in a case where the current block is applied to the current block, the overlapped block motion compensation may be performed on at least one or both of an advanced temporal motion vector predictor (ATMVP) candidate and a spatial-temporal motion vector predictor (STMVP) candidate.

In a case where the current block is predicted by applying the triangle partition mode described above, in order to perform the encoding/decoding on the current block, the encoder or the decoder may decide W candidates, which are among the candidates included in the candidate list, as candidates for deriving the motion information of the current block. For example, W may be 2. In a case where a size of the current block is equal to or greater than M×N, the current block may be encoded/decoded by applying the triangle partition mode. The triangle partition mode may be an example of the merge mode. That is, in the example described above, the candidate list that is used in order to perform the encoding/decoding may mean the merge candidate list. Whether or not the current block is encoded/decoded by applying the triangle partition mode may be signaled at a coding unit level. At this point, M and N may be positive integers. In addition, M and N may be the same and may be different. For example, M and N may be 8.

In a case where the current block is encoded/decoded by applying the triangle partition mode, the current block may be partitioned into two triangular regions. At this time, information on a partition direction for partitioning the current block into two triangular regions may be encoded/decoded. In order to encode/decode each of the two triangular regions that results from the partitioning, motion information for the encoding/decoding of each of the two triangular regions may be selected from the candidate list.

In order to derive the motion information for each of the triangular regions, an index for each of the triangular regions may be encoded/decoded. For example, in a case where the current block is partitioned into the first subblock and the second subblock, a first index for encoding/decoding a first region and a second index for encoding/decoding a second region may be encoded/decoded. At this point, when two pieces of information of the reference block with respect to the current block are decided, information that is indicated by the first index may be information of the first reference block with respect to the current block, and information that is indicated by the second index may be information of the second reference block with respect to the current block.

The first prediction block and the second prediction block may be generated or derived with respect to their respective subblocks, using pieces of motion information that are derived with the first index and the second index. At this time, the final prediction block with respect to the current block may be generated or derived using the generated first prediction block and second prediction block.

When performing the encoding/decoding on the current block, an indicator that indicates whether or not the overlapped block motion compensation is applied may be transferred, and the indicator may be transmitted at a certain level such as a tile header, a slice header, a block, or a brick.

The overlapped block motion compensation will be described in detail below with reference to FIGS. 14 to 16.

Next, a process of entropy-encoding/decoding the information on the motion compensation is described in detail (S850 and S910).

The encoding apparatus may entropy-encode the information on the motion compensation and the decoding apparatus may entropy-decode the information on the motion compensation that is included in a bitstream. At this point, the information on the motion compensation that is entropy-encoded/decoded may include at least one of inter prediction indicator)(inter_pred_idc), a reference picture index (ref_idx_l0, ref_idx_l1, ref_idx_l2, ref_idx_l3), a motion vector candidate index (mvp_l0_idx, mvp_l1_jdx, mvp_l2_idx, mvp_l3 jdx), a motion vector difference, information on whether or not to apply a skip mode (cu_skip_flag), information on whether or not to apply a merge mode (merge_flag), a merge index information (merge_index), a weighting factor (wf_l0, wf_l1, wf_l2, wf_l3), and an offset value (offset_l0, offset_l1, offset_l2, offset_l3).

The inter prediction indicator may indicate an inter-prediction direction (uni-directional prediction, bi-directional prediction, or the like) with respect to the current block when performing the inter prediction. The inter prediction indicator may mean the number of reference pictures that are used by the current block when generating the prediction block. In addition, one reference picture may be used for prediction of multiple directions, and in this case, prediction of M directions may be performed using N (N is a positive integer that is greater than 0) reference pictures (at this time, M is a positive integer that is equal to or greater than N). In addition, the inter prediction indicator may indicate the number of prediction blocks that are used when the inter prediction or the motion compensation is performed on the current block). In addition, the inter prediction indicator may mean the number of prediction blocks that are used when the inter prediction or the motion compensation is performed on the current block using at least one or more reference picture lists such as L0 and L1. At this point, L0 and L1 may mean List 0 and List 1, respectively. In addition, the inter prediction indicator may be information on whether or not the current block refers to a maximum of N reference pictures lists. At this point, N may be 1 or 2. The motion compensation may be performed on the current block using the one or two reference picture lists described above.

The reference picture index may specify the reference picture in each reference picture list, which is referred to by the current block. One or more reference picture indexes may be entropy-encoded/decoded for each reference picture list. The motion compensation may be performed on the current block using one or more reference picture indexes.

The motion vector candidate index indicates the motion vector candidate with respect to the current block, in the motion vector candidate list that is generated for each reference picture list or for each reference picture index. At least one or more motion vector candidate indexes may be entropy-encoded/decoded for each motion vector candidate list. The motion compensation may be performed on the current block using at least one or more motion vector candidate indexes.

The motion vector difference indicates a value of a difference between the motion vector and the predicted motion vector. For the current block, one or more motion vector differences may be entropy-encoded/decoded for the motion vector candidate list that is generated for each reference picture list or for each reference picture index. The motion compensation may be performed on the current block using one or more motion vector differences.

The information on whether or not to apply the skip mode (cu_skip_flag) may indicate the application of the skip mode in a case where the information takes 1 that is a first value and may not indicate the application of the skip mode in a case where the information takes 0 that is a second value. The skip mode may be used on the basis of the information on whether or not to apply the skip mode, and the motion compensation may be performed on the current block.

The information on whether or not to apply the merge mode (merge_flag) may indicate the application of the merge mode in a case where the information takes 1 that is the first value and may not indicate the application of the merge mode in a case where the information take 0 that is the second value. The merge mode may be applied on the basis of the information on whether or not to apply the merge mode, and the motion compensation may be performed on the current block.

The merge index information (merge_index) may mean information that indicates the merge candidate in the merge candidate list.

In addition, the merge index information may mean information on a merge index.

In addition, the merge index information may indicate a block that derives the merge candidate, of blocks that are reconstructed in a manner that is spatially/temporally adjacent to the current block.

In addition, the merge index information may indicate at least one or more of the pieces of motion information that are retained by the merge candidate. For example, in a case where the merge index information takes 0 that is a first value, the merge index information may indicate the first merge candidate in the merge candidate list. In a case where the merge index information takes 1 that is a second value, the merge index information may indicate the second merge candidate in the merge candidate list. In a case where the merge index information takes 2 that is a third value, the merge index information may indicate the third merge candidate in the merge candidate list. In the same manner, in a case where the merge index information takes fourth to N-th values, the merge index information may indicate a corresponding merge candidate according to the order in the merge candidate list. At this point, N may be 0 or a positive integer.

The motion compensation for the current block may be performed on the basis of the merge mode index information by applying the merge mode.

When the motion compensation for the current block is performed, in a case where two or more prediction blocks are generated, the final prediction block with respect to the current block may be generated through the weighted sum of the prediction blocks. When computing the weighted sum, at least one or both of a weighting factor and an offset may be applied to each prediction block. A weighted-sum factor, such as the weighting factor or the offset, that is used for weighted-sum computation, may be entropy-encoded/decoded many times, which are as many as or greater than the number of at least one of the reference picture lists, the reference pictures, the motion vector candidate indexes, the motion vector differences, the motion vectors, the pieces of information on whether or not to apply the skip mode, the pieces of information on whether or not to apply the merge mode, and the pieces of merge index information. In addition, a weighted-sum factor for each prediction block may be entropy-encoded/decoded on the basis of the inter prediction indicator. At this point, the weighted-sum factor may include at least one of the weighting factor and the offset.

In addition, the encoder or the decoder may entropy-encoded/decoded at least one or more of pieces of information on the motion compensation in at least one of a video parameter set, a sequence parameter set, a picture parameter set, an adaptation parameter set, a tile header, and a slice header.

In addition, at least one or more of the pieces of information on the motion compensation may be used as prediction values for at least one or more of pieces of information of the motion block for the neighboring block, which is encoded/decoded, and thus difference values for at least one or more of pieces of information on the motion compensation may be entropy-encoded/decoded. The predication values for at least one or more of the pieces of information on the motion compensation and the difference values for at least one or more of the pieces of information on the motion compensation may be added and thus values for at least one or more of the pieces of information on the motion compensation may be calculated.

In addition, the entropy encoding/decoding may not be performed on at least one of the pieces of information on the motion compensation, at least one or more of the pieces of information on the motion compensation for the neighboring block, which is encoded/decoded, may be used as at least one or more of pieces of information on the motion compensation for the current block.

In addition, at least one or more of the pieces of information on the motion compensation may be derived on the basis of at least one or more of the coding parameters.

In addition, at least one or more of the pieces of information on the motion compensation may be entropy-decoded from a bitstream on the basis of at least one or more of the coding parameters. At least one or more of the pieces of information on the motion compensation may be entropy-encoded into the bitstream on the basis of at least one or more of the coding parameters.

In addition, the information on the motion compensation may further include at least one or more of the motion vector, motion vector resolution information, overlapped block motion compensation information, local illumination compensation information, affine motion compensation information, decoder-side motion vector refinement information, and bi-directional optical flow information.

The motion vector resolution information may be information on whether or not to use specific resolution for at least one or both of the motion vector and the motion vector difference. The resolution here may mean a level of precision. At this point, a unit of measurement of the specific resolution may be at least one or more of 16-pixel (16-pel), 8-pixel (8-pel), integer-pixel (integer-pel), ½-pixel (½-pel), ¼-pixel (¼-pel), ⅛-pixel (⅛-pel), 1/16-pixel (1/16-pel), 1/32-pixel (1/32-pel), and 1/64-pixel (1/64-pel).

The overlapped block motion compensation information may be information on whether or not a subblock that, when performing the motion compensation for the encoding/decoding-target block, is generated using motion information of a neighboring block that is spatially adjacent to the encoding/decoding-target block is used when generating the prediction block with respect to the encoding/decoding-target block.

The local illumination compensation information may be information on whether or not at least one or both of the weighting factor and the offset value are applied when generating the prediction block with respect to the encoding/decoding-target block. At this time, the weighting factor and the offset value may be values that are calculated on the basis of the reference block.

The affine motion compensation information may be information on whether or not an affine motion model is used when performing the motion compensation for the encoding/decoding-target block. At this time, the affine motion model may be a method in which one block is partitioned into many subblocks using multiple parameters and motion vectors of the subblocks that result from the partitioning are calculated from representative motion vectors.

The decoder-side motion vector derivation information may be information on whether or not the motion vector necessary for the motion compensation is derived and used in the decoder. At this time, information on the motion vector may not be entropy-encoded/decoded. For example, when applying the merge mode, the decoder-side motion vector derivation may be performed.

The bi-directional optical flow information may be information on whether or not the motion compensation is performed by correcting the motion vector on a per-pixel basis. At this time, the motion vector on a per-pixel basis may not be entropy-encoded/decoded. In addition, the motion vector correction may mean a method of changing a motion vector value from the motion vector on a per-block basis to the motion vector on a per-pixel basis.

The motion compensation may be performed on the current block using at least one or more of pieces of information on the motion compensation that are entropy-decoded. The motion compensation may be performed on the current block using at least one or more of the pieces of information on the motion compensation and at least one or more of the pieces of information on the motion compensation may be entropy-encoded.

When at least one or more of the pieces of information on the motion compensation are entropy-encoded/decoded, at least one binarization method of a truncated rice binarization method, K-th order exponential-Golomb (K-th order Exp_Golomb) binarization method, a restricted K-th order exponential-Golomb (K-th order Exp_Golomb) binarization method, a fixed-length binarization method, a unary binarization method, and a truncated unary binarization method may be used.

When at least one or more of the pieces of information on the motion compensation are entropy-encoded/decoded, a context model may be decided using at least one or more of the pieces of information on the motion compensation for the neighboring block, or at least one or more of pieces of information on the motion compensation that are previously encoded/decoded, or information on a current unit/block depth, or information on a current unit/block size.

When at least one or more of the pieces of information on the motion compensation are entropy-encoded/decoded, at least one or more of the pieces of information on the motion compensation for the neighboring block, or at least one or more of the pieces of information on the motion compensation that are previously encoded/decoded, or the information on the current unit/block depth, or the information on the current unit/block size may be used as a prediction value for information on the motion compensation for the current block.

The overlapped block motion compensation will be described in detail below with reference to FIGS. 14 to 16.

Figure 14:
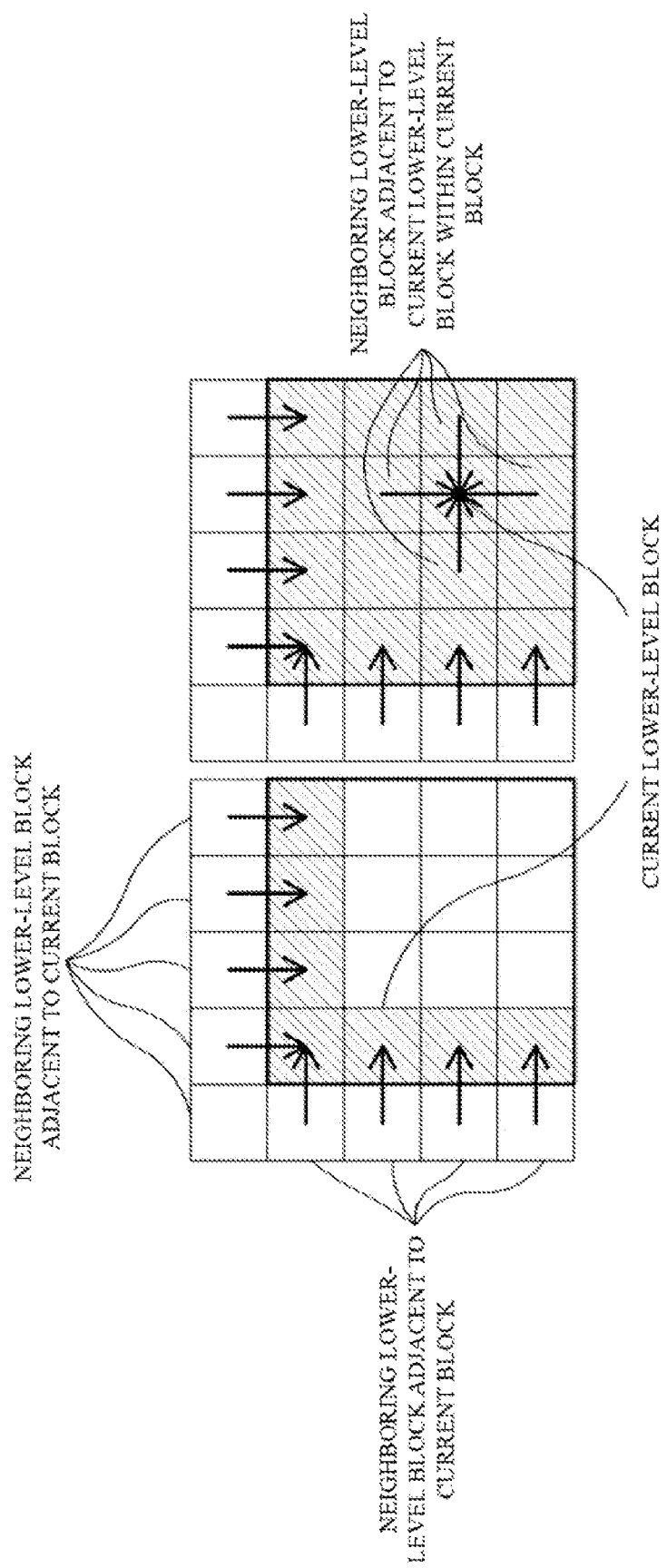
FIG. 14 is a diagram for describing an example of performing a subblock-based overlapped block motion compensation.

FIG. 14 is a diagram for describing an example of performing the overlapped block motion compensation on a per-subblock-block basis.

With reference to FIG. 14, a hatched block may be a region to which the overlapped block motion compensation is applied. The hatched block may be a subblock that corresponds to the inner boundary of the current block or be a subblock within the current block. In addition, a block indicated by a thick line may be the current block.

In addition, an arrow may mean that the motion information of the adjacent neighboring subblock is used for motion compensation for a current subblock. At this point, a position that corresponds to an arrow tail may mean 1) a neighboring subblock adjacent to the current block, or 2) a neighboring subblock adjacent to a current subblock within the current block. In addition, a position that corresponds to an arrow head may mean the current subblock within the current block.

In the hatched block, the weighted sum of the first prediction block and the second prediction block may be calculated. As the motion information that is used when generating the first prediction block, motion information of the current subblock within the current block may be used. As the motion information that is used when generating the second prediction block, at least one or both of the motion information of the neighboring subblock adjacent to the current block and the motion information of the neighboring subblock adjacent to the current subblock within the current block may be used.

In addition, in order to improve the encoding efficiency, pieces of motion information that are used for generation of the second prediction block may be pieces of motion information of at least one or more of an upper block, a left block, a lower block, a right block, an upper right block, a lower right block, an upper left block and a lower left block, with respect to a position of the current subblock within the current block. A position of the available neighboring subblock may be decided according to the position of the current subblock. For example, in a case where the current subblock is positioned on an upper boundary, at least one of the neighboring subblocks that are positioned on an upper, an upper right, and an upper left of the current subblock may be used. In a case where the current subblock is positioned on a left boundary, at least one of the neighboring subblocks that are positioned on a left side, an upper left, and a lower left of the current subblock may be used.

On the other hand, a size of the subblock may be N×M where N and M are positive integers. N and M may be the same or be different from each other. For example, a size of the subblock may be 4×4 or 8×8, and subblock size information may be entropy-encoded/decoded on a per-sequence basis.

In addition, in a case where the triangle partition mode is applied to the current block, the subblock may be in the form of two triangles each having a width of N and a length of M. As an example, in a case where the size of the current block is 8×8, the subblocks may be in the form of two triangles each having a width of 8 and a length of 8. At this time, a diagonal direction may be one of a direction from an upper left to a lower right end and a direction from a lower left to an upper right end.

In addition, the size of the subblock may be decided according to the size of the current block. For example, in a case where the size of the current block is equal to or smaller than those of K samples, 4×4 subblocks may be used, and in a case where the size of the current block is greater than those of K samples, 8×8 subblocks may be used. At this point, K is a positive integer and, for example, may be 256.

At this point, information on the size of the subblock may be entropy-encoded/decoded and used in at least one or more of a per-sequence basis, a per-picture basis, a per-slice basis, a per-tile basis, a per-CTU basis, a per-CU basis and a per-PU basis. In addition, the size of the subblock that is pre-defined in the encoder and the decoder may be used.

The subblock may be in the form of at least one or more of a square, a rectangle, and a triangle. For example, in a case where the current block is in the form of a square or a rectangle, the subblock may be in the form of a square.

For example, in a case where the current block is in the form of a rectangle, the subblock may be in the form of a rectangle.

At this point, information on the form of the subblock may be entropy-encoded/decoded and used in at least one or more of a per-sequence basis, a per-picture basis, a per-slice basis, a per-tile basis, a per-CTU basis, a per-CU basis and a per-PU basis. In addition, as the form of the subblock, a form that is pre-defined in the encoder and the decoder may be used.

The size of the current block on which the overlapped block motion compensation is performed may be equal to or greater than P x Q where P and Q may be positive integers. P and Q may be the same and be different from each other. In addition, P may be greater than K1 times U that is a horizontal length of the subblock, and Q may be equal to or greater than K1 times V that is a vertical length of the subblock. At this time, each of U and V may be one of 4, 8, 16, 32, 64, and 128 and K1 may be one of 1, 2, and 3. Each of P and Q may be greater than or equal to U and V. For example, a maximum product of P and Q may be 128×128, and U and V may be smaller than or equal to 128. For example, the current block may be made up of one subblock.

The overlapped block motion compensation may be performed on at least one or both of the subblocks that are positioned on the inner upper boundary of the current block and the subblocks that are positioned on the inner left boundary of the current block.

In addition, the neighboring blocks that are adjacent to a lower boundary and a right boundary of the current block are not encoded/encoded, and therefore, the overlapped block motion compensation may not be performed on at least one or both of the subblocks that are positioned on the inner lower boundary of the current block and the subblocks that are positioned on the inner right boundary of the current block.

In addition, the neighboring blocks that are adjacent to a lower boundary and a right boundary of the current block may not be encoded/decoded, and therefore, the overlapped block motion compensation may be performed on at least one or both of the subblocks that are positioned on the inner lower boundary of the current block and the subblocks that are positioned on the inner right boundary of the current block, using pieces of motion information of at least one or more sub blocks that are positioned within the current block, of an upper subblock, a left subblock, a lower subblock, an upper left subblock, a lower left subblock, and an upper right subblock of the encoding/decoding-target subblock.

In addition, in a case where the merge mode is applied to the current block and where at least one or both of an advanced temporal motion vector prediction candidate and a spatial-temporal motion vector prediction candidate are applied, the overlapped block motion compensation may not be performed on at least one or both of the subblocks that are positioned on the inner lower boundary of the current block and the subblocks that are positioned on the inner right boundary of the current block.

In addition, in a case where the current block is in the decoder-side motion vector derivation mode, the overlapped block motion compensation may not be performed on at least one or both of the subblocks that are positioned on the inner lower boundary of the current block and the subblocks that are positioned on the inner right boundary of the current block.

In addition, in a case where the current block is in the affine motion compensation mode, the overlapped block motion compensation may not be performed on at least one or both of the subblocks that are positioned on the inner lower boundary of the current block and the subblocks that are positioned on the inner right boundary of the current block.

In addition, the overlapped block motion compensation may be performed on at least one or more of color components of the current block. At this time, the color component may include at least one or more of a luma component, a chroma component, and the like.

In addition, when performing the overlapped block motion compensation, a motion vector with respect to the neighboring subblock, which is used for the generation of the second prediction block, may be changed to an integer value and the motion prediction may be performed. For example, the motion vector with respect to the neighboring subblock of the upper subblock of the encoding/decoding-target block is (1.2, 0.7), a motion vector that is actually used for the generation of the second prediction block may be an nearest integer value such as (1, 1), instead of (1.2, 0.7) or may be an integer value in the direction of "0", like (1, 0). By doing this, the complexity of the overlapped block motion compensation may be reduced.

In addition, the overlapped block motion compensation may be performed according to the inter prediction indicator of the current block. That is, in a case where the current block is for at least one or more of uni-directional prediction, bi-directional prediction, tri-directional prediction, and quad-directional prediction, the overlapped block motion compensation may be performed.

In addition, in a case where the current block is for the uni-directional prediction, the overlapped motion compensation may be performed. That is, in a case where at least one of the bi-directional prediction, the tri-directional prediction, and the quad-directional prediction is performed on the current block, the overlapped motion compensation may not be performed. The complexities of the encoding and the decoding when performing the overlapped motion compensation are higher than the complexities of the encoding and the decoding that performs general bi-directional prediction, and therefore, only in a case where the uni-directional prediction is performed, the overlapped block motion compensation may be performed in order to solve this problem.

In a case where the current block or the subblock is not for the uni-directional prediction, the overlapped block motion compensation may not be performed on the block or the subblock. That is, in a case where the current block or the subblock is not for the uni-directional prediction, the generation of the second prediction block may not be performed. This may be done to maintain the complexity of a motion compensation step that is, at a maximum, the same as that of the bi-directional prediction.

In a case where the current block is for the uni-directional prediction, the second prediction block may be generated using the motion information of the adjacent neighboring subblock. That is, in a case where the current block is for the uni-directional prediction, the overlapped block motion compensation may be performed.

When the first prediction block is generated using the motion information of the subblock of the current block, one piece of motion information may be derived using at least one or more of the upper block, the upper left block, the upper right block, the left block, and the lower left block, which are adjacent to the current block.

When the second prediction block is generated using the motion information of the subblock of the current block, a maximum of one piece of motion information may be derived using at least one or more of the upper block, the upper left block, the upper right block, the left block, and the lower left block, which are adjacent to the current block.

In addition, when the second prediction blocks are generated using the motion information of the neighboring subblock adjacent to the encoding/decoding-target subblock within the current block, one piece of motion information may be derived using at least one or more of the upper subblock, the left subblock, the lower subblock, and the right subblock block.

At this point, the derivation of the motion information may mean that the first prediction block or the second prediction block is generated using the derived motion information and that the generated first prediction block and second prediction block are used for the overlapped block motion compensation.

The second prediction block may be generated only for the subblock that corresponds to at least one or more boundaries of the current block. Using the generated second prediction block, the overlapped block motion compensation may be performed. The motion compensation on a per-small-block basis increases the complexity of the encoding/decoding, and therefore the operation of the encoder or the decoder may be performed to minimize an increase in the complexity due to the application of the overlapped block motion compensation.

In addition, the overlapped block motion compensation may be performed only on the region that corresponds to the inner boundary of the current block.

On the other hand, if the encoding efficiency is maximized at the expense of an increase in the complexity of the encoding/decoding, the overlapped block motion compensation may be performed on all subblocks within the current block.

Whether or not to perform the overlapped block motion compensation only on the subblock that corresponds to a boundary of the current block may be signaled through a high-level, such as parameter set, a sequence parameter set, a picture parameter set, a tile header or a slice header.

The motion information may hereinafter mean a motion vector corresponding to a specific reference picture list L0 or L1, and reference picture index information (an index). Therefore, the bi-directional prediction block may contain the motion information corresponding to the list L0 and the motion information corresponding to the list L1.

The encoder or the decoder may derive one piece of motion information that is used for generation of the first prediction block, from one neighboring block that is among the neighboring blocks adjacent to the current block and may use the derived motion information, and may derive one piece of motion information that is used for the generation of the second prediction block, from one neighboring block that is among the neighboring blocks adjacent to the current block and may use the derived motion information. At this time, at least one of the following embodiments may be utilized.

A region that corresponds to the inner upper boundary of the current block may select one piece of motion information of the neighboring subblock adjacent to the inner upper boundary. The subblock that corresponds to the inner left boundary of the current block may select one piece of motion information of the neighboring subblock adjacent to the inner left end boundary.

At this time, in either case, a maximum of one neighboring subblock may be present. That is, as the neighboring subblock adjacent to the upper boundary subblock, one upper subblock may be present, and, as the neighboring subblock adjacent to the left boundary subblock, one left subblock may be present. At this time, all the motion vectors with respect to the upper or left boundary subblocks may be the same, and motion vectors with respect to a neighboring upper subblock or neighboring left subblocks of the subblocks may also be the same.

In this case, the term "subblock", which is used in the present specification, may be interpreted to have the same meaning as the "block". In addition, in this case, motion vectors with respect to the neighboring subblocks of the upper or left boundary subblocks may be the same, and motion vectors with respect to the neighboring upper subblocks or the neighboring left subblocks of the subblocks may also be the same. In this case, the term "subblock", which is used in the present specification, may mean one block that is made up of the adjacent subblocks.

If the number of motion information of the neighboring subblock adjacent to the upper boundary or left boundary subblock is equal to one, such one piece of motion information may be selected. That is, the neighboring subblock adjacent to the upper boundary or left boundary subblock is coded in the uni-direction prediction, the uni-directional motion information may be selected.

In a case where the neighboring subblock adjacent to the upper boundary or left boundary subblock is not for one of the bi-directional prediction, the tri-directional prediction, and quad-directional prediction, the uni-directional motion information may be selected.

If the number of motion information of the neighboring subblock adjacent to the upper boundary or left boundary subblock is equal to two, one piece of motion information may be selected using at least one of the following embodiments. That is, the neighboring subblock adjacent to the upper boundary or left boundary subblock is coded in the bi-directional prediction, the motion information may be selected using at least one of the following embodiments.

As an example, in a case where the inter prediction indicator of the subblock of the current block indicates L0 (or L1) prediction, the motion information corresponding to the list L1 (or L0), which is among the pieces of motion information of the neighboring blocks of the current block, may be selected as the motion information of the subblock.

As another example, in a case where the inter prediction indicator of the subblock of the current block indicates the L0 (or L1) prediction, the motion information corresponding to the list L0 (or L1), which is among the pieces of motion information of the neighboring blocks of the current block, may be selected as the motion information of the subblock.

As still another example, in a case where the inter prediction indicator for first prediction of the subblock of the current block indicates the L0 (or L1) prediction, the motion information corresponding to the list L1 (or L0), which is among the pieces of motion information of the neighboring blocks of the current block, may be selected as the motion information for second prediction of the subblock.

As still another example, in a case where the inter prediction indicator for the first prediction of the subblock of the current block indicates the L0 (or L1) prediction, the motion information corresponding to the list L0 (or L1), which is among the pieces of motion information of the neighboring blocks of the current block, may be selected as the motion information for the second prediction of the subblock.

As still another example, in order to select the motion information of the subblock of the current block, a value of an L0 (or L1) inter prediction indicator of the neighboring block of the current block may be determined. At this time, according to the value of the L0 (or L1) inter prediction indicator of the neighboring block, the motion information corresponding to the list L1 (or L0), which is among the pieces of motion information of the neighboring blocks of the current block, may be selected as the motion information of the subblock.

As still another example, in order to select the motion information of the subblock of the current block, a value of an L1 (or L0) inter prediction indicator of the neighboring block of the current block may be determined. At this time, according to the value of the L1 (or L0) inter prediction indicator of the neighboring block, the motion information corresponding to the list L0 (or L1), which is among the pieces of motion information of the neighboring blocks of the current block, may be selected as the motion information of the subblock.

At this time, which one of the L0 inter prediction indicator and the L1 inter prediction indicator of the neighboring block corresponds to an inter prediction indicator whose value is to be determined may be decided by an index value for the encoding/decoding of the subblock of the current block.

As still another example, in a case where the motion vector referring to the reference picture that is not the same as the reference picture of the subblock of the current block, which is among the motion vectors with respect to the neighboring subblock, is present, the motion information associated with this may be selected.

As still another example, the motion information that corresponds to the motion vector that is greatly different from the motion vector with respect to the subblock of the current block, which is among the motion vectors with respect to the neighboring subblocks, may be selected. At this point, a difference between the motion vectors may be a sum of an absolute value of a difference between x-direction motion vectors and an absolute value of a difference between y-direction motion vectors.

In addition, a temporal distance between a current picture and a reference picture for L0 prediction of the neighboring subblock may be different from a temporal distance between the current picture and a reference picture for L1 prediction of the neighboring subblock. In this case, the scaling may be performed on the motion vector that corresponds to the reference picture that is relatively remote in terms of the temporal distance from the current picture on the basis of the reference picture that is close in terms of the temporal distance to the current picture. Then, the scaled motion vector may be compared with the motion vector that corresponds to the reference picture which is remote in terms of the temporal distance from the current picture, and thus the difference between the motion vectors may be derived.

As still another example, at least one of L0 prediction motion information and L1 prediction motion information of the neighboring subblock may be selected.

At this time, information indicating whether or not to use which motion information of pieces of motion information that correspond to the L0 prediction and the L1 prediction may be signaled from the encoder to the decoder. This information may be signaled in a parameter set, a tile group header, a slice header, or in a block level.

As still another example, information corresponding to L0, which is among the pieces of motion information of the neighboring subblocks, may be selected without any particular condition, and information corresponding to L1, which is among the pieces of motion information of the neighboring subblocks, may be selected without any particular condition.

In a case where the neighboring subblock (the upper subblock or the left subblock) is encoded with intra prediction, at least one of the following embodiments may be utilized.

As an example, the intra prediction mode of the neighboring subblock may be applied as the intra prediction mode of the current block, and thus the second prediction block may be generated.

As another example, in a case where the neighboring subblock is encoded with the intra prediction, the overlapped block motion compensation may not be performed on the neighboring subblock.

In a case where the neighboring subblock (the upper subblock or the left subblock) is encoded with combination prediction that results from combining the intra prediction and the inter prediction, the second prediction block may be generated using the motion information (the prediction indicator, the reference picture, the motion vector, or the like) for the inter prediction of the neighboring subblock.

For a region (hereinafter referred to the upper left subblock) corresponding to the inner upper boundary and the inner left boundary of the current block, the second prediction block may be generated using one piece of motion information of one neighboring subblock of the neighboring upper subblock adjacent to the upper boundary, the neighboring left subblock adjacent to the left boundary, and the neighboring upper left subblock adjacent to the upper left boundary. At this time, the motion information may be selected using at least one of the following embodiments.

The following embodiments may also find application in a case where two pieces of motion information of the neighboring subblock are present. That is, the following embodiments may also find application in a case where the bi-directional prediction is performed on the neighboring block. In addition, the following embodiments may also find application in a case where two or more neighboring subblocks of the encoding/decoding-target subblock are present.

The motion information of the neighboring subblock adjacent to the upper, left, or upper left boundary may be selected. At this time, which subblock has the motion information to be selected may be pre-defined in the encoder/decoder or may be signaled to the decoder for transfer.

In a case where the subblock having only one piece of motion information (the uni-directional prediction), which is among the adjacent neighboring subblocks, is present, the motion information of the neighboring subblock may be selected for the generation of the second prediction block. That is, in a case where the subblock on which the uni-directional prediction is performed, of the neighboring subblocks adjacent to the upper, left, or upper left portion, is present, the motion information of the neighboring subblock may be selected.

The motion information for the generation of the second prediction block may be selected according to the similarity between the motion information of each of the neighboring subblocks and the motion information of the subblock of the current block.

The precision of the final prediction block may be increased by selecting the motion information having a relatively low similarity and thus generating the second prediction block, but a problem occurs in that the complexity of implementation increases. Taking this problem into consideration, the motion information having a high similarity may be selected for the generation of the second prediction block. One piece of motion information for the generation of the second prediction block may be selected using at least one of methods according to the following embodiments.

As an example, in a case where one neighboring subblock, which has the inter prediction indicator different from the inter prediction indicator L0 or L1 of the subblock of the current block, is present, the motion information of the neighboring subblock may be selected.

As another example, in a case where one neighboring subblock, which has the inter prediction indicator that is the same as the inter prediction indicator L0 or L1 of the subblock of the current block, is present, the motion information of the neighboring subblock may be selected.

As still another example, in a case where the motion vector referring to the reference picture that is not the same as the reference picture of the subblock of the current block, which is among the motion vectors with respect to the neighboring subblock, is present, the motion information corresponding to the neighboring subblock may be selected. Conversely, in a case where the motion vector referring to the reference picture that is the same as the reference picture of the subblock of the current block, which is among the motion vectors with respect to the neighboring subblock, is present, the motion information corresponding to the neighboring subblock may be selected.

As still another example, the motion information that corresponds to the motion vector that is greatly different from the motion vector with respect to the subblock of the current block, which is among the motion vectors with respect to the neighboring subblocks, may be used. For example, in a case where a difference between the motion vectors is at or above a specific value, the motion information associated with this may be selected. The specific value here may be pre-defined in the encoder/decoder or may be signaled from the encoder to the decoder. At this point, the difference between the motion vectors may be the sum of the absolute value of the difference between the x-direction motion vectors and the absolute value of the difference between the y-direction motion vectors.

In addition, the temporal distance between the current picture and the reference picture for the L0 prediction of the neighboring subblock may be different from the temporal distance between the current picture and the reference picture for the L1 prediction of the neighboring subblock. In this case, the scaling may be performed on the motion vector that corresponds to the reference picture that is relatively remote in terms of the temporal distance from the current picture on the basis of the reference picture that is close in terms of the temporal distance to the current picture. Then, the scaled motion vector may be compared with the motion vector that corresponds to the reference picture which is remote in terms of the temporal distance from the current picture, and thus the difference between the motion vectors may be derived.

In a case where the inter prediction is applied only to one subblock, which is among the neighboring subblock, one of the pieces of motion information of the neighboring subblocks may be selected by applying at least one of the embodiments described above.

In a case where the subblock that is encoded with the combination prediction that result from combining the intra prediction and the inter prediction is among the neighboring subblocks, the second prediction block may be generated using the motion information for the inter prediction of the neighboring subblock.

At this time, in addition to the subblock described above, another subblock to which the inter prediction is applied is among the neighboring subblocks, one of the pieces of motion information for the inter prediction of the neighboring subblock, which includes the motion information for the inter prediction of the subblock, may be selected. At this time, at least one of the embodiments described above may be utilized.

In a case where both the neighboring upper subblock and the neighboring left subblock are for the intra prediction, and where the neighboring upper left subblock adjacent to the upper left subblock within the current block is for the inter prediction, the second prediction block may be generated using one piece of the motion information of the neighboring upper left subblock adjacent to the upper left subblock. As a method of selecting one piece of motion information from the neighboring upper left side subblock, at least one of the embodiments described above may be utilized.

In a case where the intra prediction is applied to all neighboring subblocks, the second prediction block may be generated using the intra prediction mode of at least one of the neighboring subblocks. At this time, which subblock of the neighboring subblock has the intra prediction mode to be used may be decided in advance and may be decided by a value that is signaled.

On the other hand, the intra prediction has a lower complexity than the inter prediction, and therefore, many second prediction blocks, as many as the number of different intra prediction modes, may be generated using the intra prediction modes of all the neighboring subblocks.

In addition, in a case where the intra prediction is applied to all the neighboring subblock, the overlapped block motion compensation may not be performed on the encoding/decoding-target subblock.

In a case where two or more neighboring subblocks of the subblock adjacent to the inner block boundary of the current block are present, one motion vector may be derived by summing up the motion vectors with respect to the neighboring subblocks using weighting factors, and the second prediction block may be generated by using the derived motion vector. For example, for the upper left subblock of the current block, one motion vector may be derived using the weighted sum of the motion vectors with respect to the neighboring subblock adjacent to the upper boundary and the neighboring subblocks adjacent to the left boundary.

For example, in a case where the motion vector in an L0 direction with respect to the neighboring subblock adjacent to the upper boundary is (x1, y1), and where the motion vector in the L0 direction with respect to the neighboring subblocks adjacent to the left boundary is (x2, y2), the motion vector for the generation of the second prediction block with respect to the upper left subblock may be derived as $((a1*1+(1-a1)*2), (a1*y1+(1-a1)*y2)$. At this point, a1 may be at least one of $\frac{1}{8}$, $\frac{1}{4}$, $\frac{1}{2}$, and 1.

In addition, in a case where at least one of the neighboring subblocks is for the bi-directional prediction, the weighted sum of the motion vectors may be derived for the direction L0 or L1 in which two or more motion vectors that have the same inter prediction indicator are present. On the other hand, in a case where neither two nor more motion vectors that are the same are present, the motion vector may be used as is. One piece of motion information for the generation of the second prediction block may be selected according to the similarity between each of the pieces of motion information that correspond to the derived lists L0 and L1 and the motion information of the subblock of the current block.

At least two methods according to the embodiment described above may be combined, and thus one piece of motion information that is used for the generation of the second prediction block may be derived from at least one neighboring block of the neighboring subblocks adjacent to the current block.

In a case where the current block has the motion vector on a per-subblock basis and where the subblocks are for the uni-directional prediction, the second prediction blocks may be generated using the motion information of the neighboring subblock adjacent to the subblock within the current block. At this time, in a case where the subblock of the current block is the subblock on the left or upper boundary of the current block, a process of deriving the motion information for the generation of the second prediction block, which is described above, may be performed.

In addition, in a case where the triangle partition mode is applied to the current block, where the current block has the motion vector on a per-subblock-block basis, and where the subblocks are for the uni-directional prediction, the first prediction block and the second prediction block may be generated using the motion information of the neighboring subblock adjacent to the current block. In order to maintain the complexity of the motion compensation in the subblock, which is the same as the maximum complexity of the bi-directional prediction, a maximum of one piece of motion information that is used for the second prediction block may be derived using at least one of the neighboring upper subblock, the neighboring left subblock, the neighboring lower subblock, and the neighboring right subblock adjacent to the subblock within the current block.

As an example, for the lower subblock positioned on the inner lower boundary of the current block, one piece of motion information for generating a second prediction subblock may be derived using at least one of the subblocks, which are present within the current block, of the neighboring upper subblock, the neighboring left subblock, and the neighboring right subblock of the subblock.

As another example, for the right subblock positioned on the inner right boundary of the current block, one piece of motion information for generating the second prediction subblock may be derived using at least one of the subblocks that are present within the current block, of the neighboring left subblock, the neighboring upper subblock, and the neighboring lower subblock of the subblock.

As still another example, for the subblocks (hereinafter referred to as "lower right end subblocks) positioned on the inner lower and right boundarys of the current block, one piece of motion information for generating the second prediction subblock may be derived using at least one of the neighboring upper subblock, the neighboring left subblock, and the neighboring upper left subblock of the subblock.

At this time, as a method of deriving one piece of motion information from the neighboring subblocks of the lower block within the current block, at least one of the following embodiments may be utilized.

As an example, one piece of motion information of one neighboring subblock may be selected from among the neighboring subblocks. At this time, which subblock has which motion information to be selected may be pre-defined or may be signaled in at least one or more of a parameter set, such as a video parameter set (VPS) or a sequence parameter set (SPS), a picture parameter set (PPS), a tile header, a slice header, and a coding tree unit (CTU).

Alternatively, at least one of methods in which one piece of motion information for the generation of the second prediction block is selected according to the similarity between the motion information of the subblock within the current block described above and each of the pieces of motion information of the neighboring subblocks may be utilized.

Alternatively, at least one of methods in which one piece of motion information is derived with the weighted sum of the motion vectors with respect to the neighboring subblocks of the neighboring block within the current block described above may be utilized.

In a case where at least one or both of the neighboring subblock adjacent to the current block, and the neighboring subblock within the current block, which is adjacent to the subblock of the current block, are present, the motion information that is used for the generation of the second prediction block may be derived.

In a case where the motion vector that is used for the generation of the second prediction block is not the same as the motion vector that is used for the generation of the first prediction block, the motion information that is used for the generation of the second prediction block may be derived. Alternatively, in a case where a difference between two motion vectors is at or above a pre-defined value, the motion information that is used for the generation of the second prediction block may be derived.

At this time, a motion vector difference between two motion vectors, vectors (x1, y1) and (x2, y2), for example, may be a sum of an absolute value of (x1−x2) and an absolute value of (y1−y2) and a pre-defined value may be a positive integer value that is greater than 0. Alternatively, an absolute value of (x1−x2) and an absolute value of (y1−y2) are each greater than a pre-defined value, the motion information that is used for the generation of the second prediction block may be derived. At this time, a pre-defined value against which the absolute value of (x1−x2) is compared and a pre-defined value against which the absolute value of (y1−y2) is compared may be different values.

In addition, in a case where the reference picture index that is used for the generation of the second prediction block is not the same as the reference picture index that is used for the generation of the first prediction block, the motion information that is used for the generation of the second prediction block may be derived.

In addition, on the basis of the inter prediction indicator that is used for the generation of the first prediction block, in a case where at least one of the motion vector and the reference picture index that are used for the generation of the second prediction block and at least one of the motion vector and the reference picture index that are used for the first prediction block generation are not the same, the motion information that is used for the generation of the second prediction block may be derived.

In a case where a difference between each of the motion vectors with respect to the neighboring subblock and the motion vector with respect to the current block or the subblock is above a pre-defined value, only the motion vectors associated with this may be used for the generation of the second prediction block. Therefore, in a case where a difference between each of all motion vectors with the neighboring subblock and the motion vector with respect to the current block or the subblock is at or below the pre-defined value, the motion information that is used for the generation of the second prediction block may not be derived.

In a case where the current block is in the inter prediction mode and where the intra prediction mode is applied to at least one or more of the neighboring subblocks adjacent to the current block, the intra prediction mode of the neighboring subblock may be applied to the subblock of the current block, and thus the second prediction block may be generated.

Figure 15:
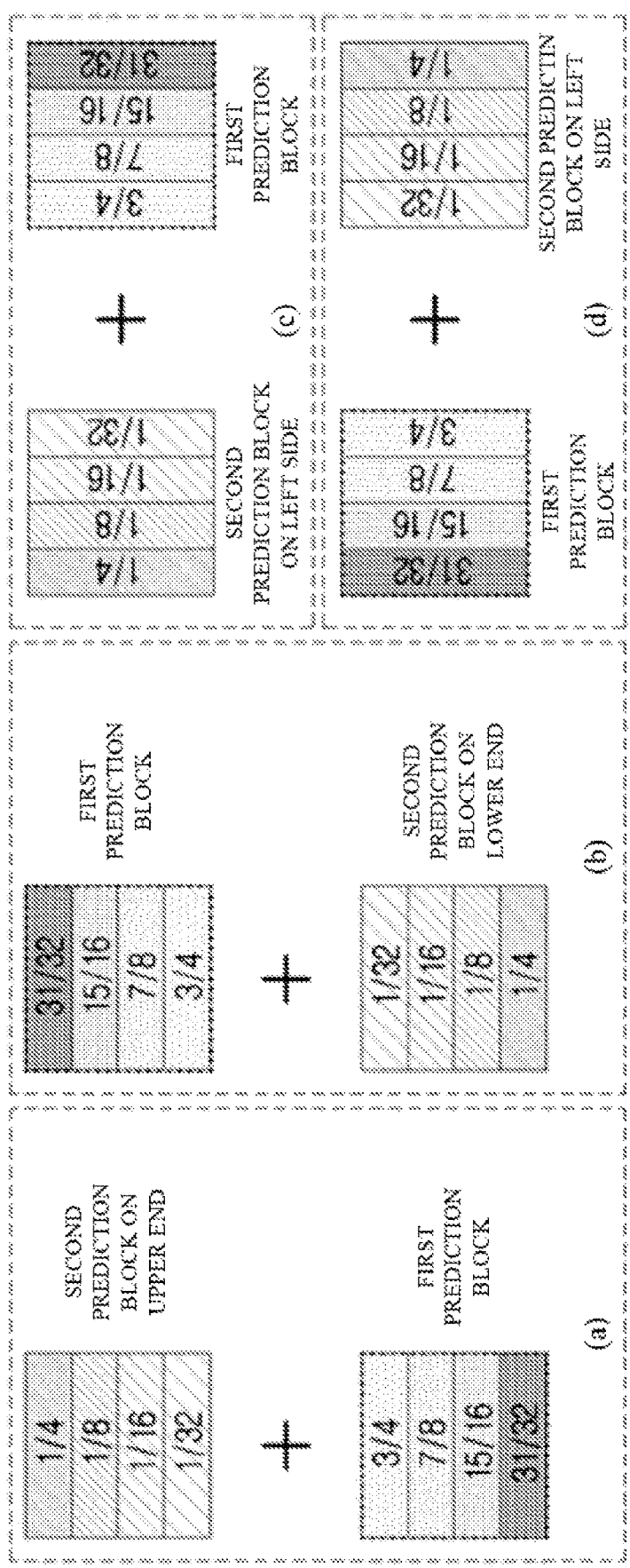
FIG. 15 is a diagram for describing an implementation example of applying a weighting factor when calculating a weighted sum of a first prediction block and a second prediction block.

FIG. 15 is a diagram for describing an implementation example of applying a weighting factor when calculating the weighted sum of the first prediction block and the second prediction block.

When calculating the weighted sum of the first prediction block and the second prediction block, different weighting factors may be used on a per-row or -column basis according to a position of a sample within a block. Then, weighted sums of samples at the same position within the first prediction block and the second prediction block may be calculated. At this time, when calculating the weighted sum for generating the final prediction block, at least one or both of a weighting factor and an offset may be used.

At this point, the weighting factor may be a negative number that is smaller than 0 and may be a positive number that is greater than 0. Then, the offset may be 0, be a negative number that is smaller than 0, and be a positive number that is greater than 0.

On the other hand, when calculating the weighted sum of the first prediction block and the second prediction block, the same weighting factor may be used on a per-prediction-block basis at all sample positions. In addition, when calculating the weighted sum of the first prediction block and the second prediction block, different weighting factors may be used on a per-prediction-block basis at all sample positions.

With reference to FIG. 15, weighting factors, such as $3/4$, $7/8$, $15/16$, and $31/32$, may be used on a per-row or -column basis in the first prediction block, and weighting factors, such as $1/4$, $1/8$, $1/16$, and $1/32$, may be used on a per-row or -column basis in the second prediction block. At this time, regarding the weighting factors described above, the same weighting factor may be used in sample positions that belong to the same row or in sample positions that belong to the same column.

The closer the weighting factor may be to a boundary of the current subblock, the higher value the weighting factor to be used may have. In addition, each weighting factor may be applied to all sample within the subblock.

FIGS. 15(a), 15(b), 15(c), and 15(d) illustrate examples where the second prediction blocks are generated using motion information of a neighboring upper block, motion information of a neighboring lower block, motion information of a neighboring left block, and motion information of a neighboring right block, respectively. At this point, the second prediction block on the upper, the second prediction block on the lower, the second prediction block on the left side, and the second prediction block on the right side may mean the second prediction blocks that are generated on the basis of the motion information of the neighboring upper block, the motion information of the neighboring lower block, the motion information of the neighboring left block, and the motion information of the neighboring right block, respectively.

Figure 16:
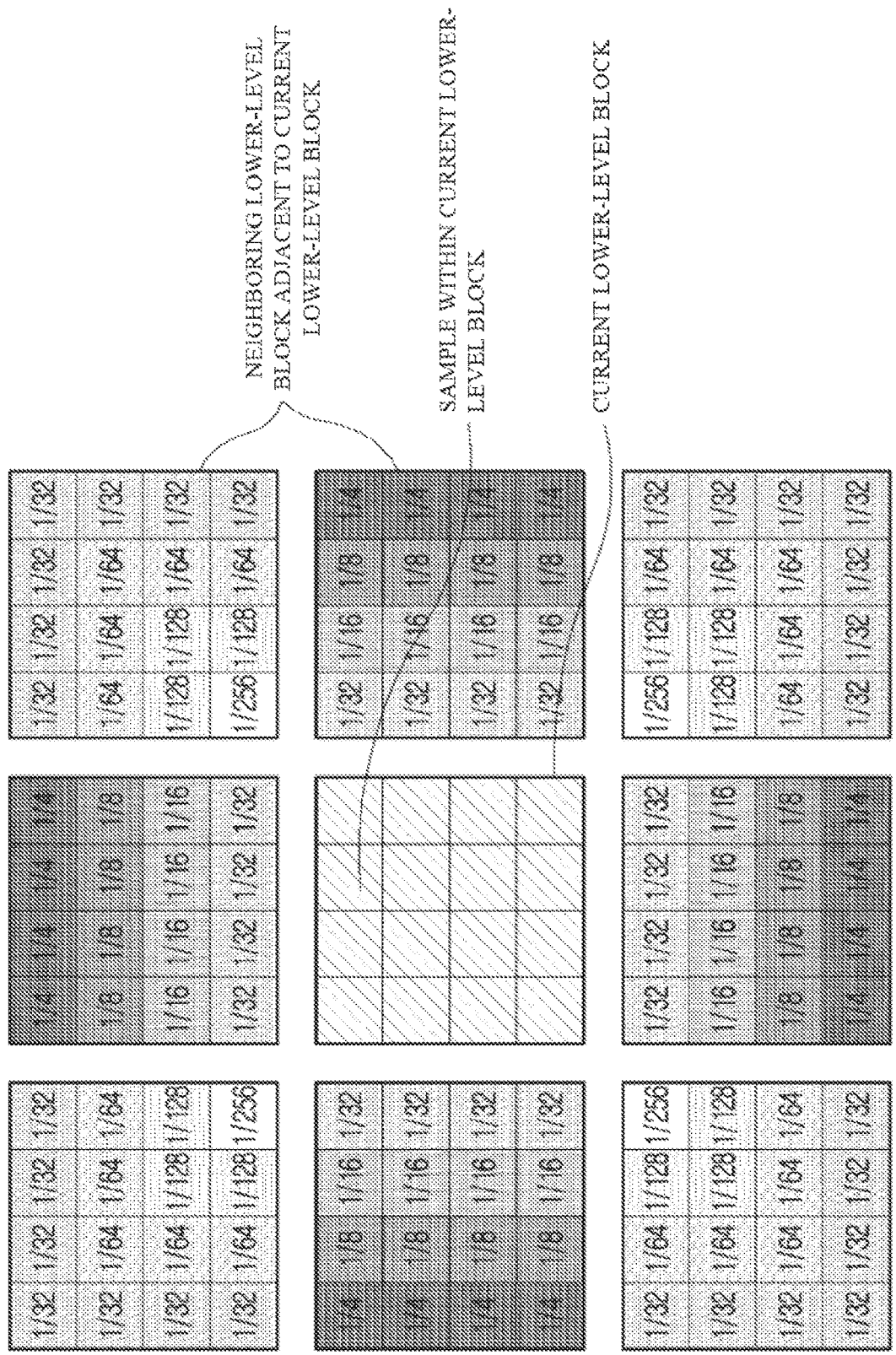
FIG. 16 is a diagram for describing an implementation example in which different weighting factors are applied according to sample positions within a block when calculating the weighted sum of the first prediction block and the second prediction block.

FIG. 16 is a diagram for describing an implementation example in which different weighting factors are applied according to sample positions within a block when calculating the weighted sum of the first prediction block and the second prediction block.

In order to improve the encoding efficiency, different weighting factors may be used according to the sample positions within the block when calculating the weighted sum of the first prediction block and the second prediction block. That is, the weighted sum may be calculated with different weighting factors according to positions of blocks that are spatially adjacent to the current subblock. In addition, weighted sums of samples at the same position within the first prediction block and the second prediction block may be calculated.

With reference to FIG. 16, weighting factors, such as $1/2$, $3/4$, $7/8$, $15/16$, $31/32$, $63/64$, $127/128$, $255/256$, $511/512$, and $1023/1024$, may be used on a per-sample-position basis in the first prediction block, and weighting factors, such as $1/2$, $1/4$, $1/8$, $1/16$, $1/32$, $1/64$, $1/128$, $1/256$, $1/512$, and $1/1024$, may be used on a per-sample-position basis in the second prediction block. At this point, a weighting factor, which is used in at least one or more of the second prediction block on the upper, the second prediction block on the left side, the second prediction block on the lower, and the second prediction block on the right side, may be greater than a weighting factor, which is used in at least one or more of the second prediction block on the upper left, the second prediction block on the lower left, the second prediction block on the lower right end, and the second prediction block on the upper right end.

On the other hand, the weighting factor, which is used in at least one or more of the second prediction block on the upper, the second prediction block on the left side, the second prediction block on the lower, and the second prediction block on the right side, may be the same as the weighting factor, which is used in at least one or more of the second prediction block on the upper left, the second prediction block on the lower left, the second prediction block on the lower right end, and the second prediction block on the upper right end.

In addition, weighting factors for the second prediction block, which is generated using motion information of a collocated subblock within the collocated picture, may be the same in all sample positions.

In addition, the weighting factor for the second prediction block, which is generated using the motion information of the collocated subblock within the collocated picture, may be the same as a weighting factor for the first prediction block.

In addition, the weighting factors for the second prediction block, which is generated using the motion information of the block that is encoded/decoded in a manner that is adjacent to the lower boundary region and the right boundary region of the reference block within the reference picture, may be the same in all sample positions.

In addition, the weighting factor for the second prediction block, which is generated using the motion information of the block that is encoded/decoded in a manner that is adjacent to the lower boundary region and the right boundary region of the reference block within the reference picture, may be the same as the weighting factor for the first prediction block.

In addition, in a case where the motion vector that is used for the generation of the second prediction block is derived from the neighboring subblock at a specific position, the weighting factor that is applied to the second prediction block according to a position of the neighboring subblock position may be set to increase monotonously or decrease monotonously in the horizontal direction, the vertical direction, or in the horizontal and vertical directions.

For example, in a case where the neighboring subblock is the upper subblock, the weighting factor that is applied to the second prediction block may decrease monotonously in a direction from the upper to the lower Of the block. That is, the greater a distance between samples within the current subblock that generates the first prediction block and the neighboring block, the smaller the weighting factor. This is because it is considered that the greater the distance, the higher the precision of the motion vector with the current subblock and the lower the precision of the motion information derived from the neighboring block.

A weighting factor table that is to be used may be pre-defined between the encoder and the decoder and may be selected by information, an index, or the like that is transferred from the encoder to the decoder.

In addition, in order to decrease the complexity of the calculation, the weighting factor may vary according to a magnitude of the motion vector with respect to the current subblock or a motion vector direction.

For example, in a case where an absolute value of a component x of the motion vector with respect to the current subblock is equal to or greater than a pre-defined value, ½, ¾, ⅞, and 15/16 may be used as weighting factors of left and right neighboring subblocks. On the other hand, in a case where the absolute value of the component x of the motion vector with respect to the current subblock is smaller than the pre-defined value, ⅞, 15/16, 31/32, and 63/64 may be used as the weighting factors of the left and right neighboring subblocks. At this time, the predefined value may be 0 or a positive integer.

For example, in a case where an absolute value of a component y of the motion vector with respect to the current subblock is equal to or greater than a pre-defined value, ½, ¾, ⅞, and 15/16 may be used as weighting factors of upper and lower neighboring subblocks. On the other hand, in a case where the absolute value of the component y of the motion vector with respect to the current subblock is smaller than the pre-defined value, ⅞, 15/16, 31/32, and 63/64 may be used as the weighting factors of the upper and lower neighboring subblocks. At this time, the predefined value may be 0 or a positive integer.

For example, in a case where a sum of the absolute values of the component x and the component y of the motion vector of the current subblock is equal to or greater than a pre-defined value, ½, ¾, ⅞, and 15/16 may be used as weighting factors of the current subblocks. On the other hand, in a case where the sum of the absolute values of the component x and the component y of the motion vector of the current subblock is smaller than the pre-defined value, ⅞, 15/16, 31/32, and 63/64 may be used as the weighting factors of the current subblocks. At this time, the predefined value may be 0 or a positive integer.

On the other hand, the calculation of the weighted sum may not be performed at all sample positions within the subblock and may be performed only on samples that are positioned in K rows/columns adjacent to each block boundary. At this time, K may be 0 or a positive integer, and for example, K may be 1, 2, or 4. Alternatively, the calculation of the weighted sum may be performed in all sample positions within the subblock. In this case, the weighting factor may vary from one sample to another or may differ according to a distance between the samples.

In addition, in a case where the size of the current block is equal to or greater than N×M, a weighted sum of samples that are positioned in K rows/columns adjacent to each block boundary is determined. In addition, in a case where the current block is partitioned into subblocks and where the motion compensation is performed, the weighted sum of the samples that are positioned in K rows/columns adjacent to each block boundary. At this point, K may be 0 or a positive integer, and for example, K may be 1 or 2. In addition, N and M may be positive integers, and for example, N and M may be equal to or greater than 4 or 8. N and M may be the same or may be different.

In addition, the calculation of the weighted sum may not be performed at all sample positions within the subblock and may be performed only on a sample adjacent to each block boundary. For example, in a case where the current block is partitioned into regions in the shape of a triangle, weighting-based summing may not be performed on all regions of current block, and the weighting-based summing may be performed only on a boundary region of the subblock.

In addition, without the current block being partitioned into subblocks, one piece of motion information or the intra prediction mode may be derived for the current block, and the second prediction block may be generated. In this case, the weighted sum may be calculated for all sample positions within the current block, or the weighted sum may be calculated only for samples that are positioned in K rows/columns adjacent to the block boundary.

In a case where the weighted sum of the first prediction block and the second prediction block is calculated only for the samples that are positioned in K rows/columns adjacent to the block boundary, the motion vector with respect to the current block may compensate for a decrease in the precision on the boundary of the block and thus may increase the encoding efficiency. On the other hand, in a case where the weighted sum is calculated for all sample positions within the current block, the precision of the prediction of the block may be increased in a manner similar to the way the effect of the bi-directional prediction is increased and thus the encoding efficiency may be increased.

In addition, on the basis of a color component of the current block, the weighted sum may be calculated for samples that are positioned in K rows/columns adjacent to each block boundary. At this time, K may be 0 or a positive integer, and for example, K may be 1, 2, or 4. In addition, in a case where the current block is a luma component, the weighted sum may be calculated for samples that are positioned in two to four rows/columns adjacent to each block boundary. In addition, in a case where the current block is a chroma component, the weighted sum may be calculated for samples that are positioned in one to two rows/columns adjacent to each block boundary.

In addition, in a case where decoder motion vector derivation or compensation mode is applied to the neighboring block of the current block, the motion vector with respect to the neighboring block that is used when deriving the motion information for the generation of the second prediction block may be the motion vector prior to the decoder motion vector derivation or compensation, instead of the final motion vector with respect to the block on which the motion vector derivation or compensation is completely performed.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. An image decoding method comprising:
determining a prediction mode of a current block; and
performing inter prediction for the current block based on the determined prediction mode,
wherein a first prediction block and a second prediction block are generated for the current block,
wherein a final prediction block for the current block is generated using a weighted sum of a first pixel of the first prediction block and a second pixel of the second prediction block,
wherein after a first indicator for the first prediction block is set to '0', motion information of an L1 direction of a first adjacent block of the current block is used as first motion information to generate the first prediction block,
wherein the first prediction block is generated based on a motion vector and a reference picture index of the first motion information, and
wherein the weighted sum is applied only to a first partial region of the first prediction block and a second partial region of the second prediction block.

2. An image encoding method comprising:
determining a prediction mode of a current block; and
performing inter prediction for the current block based on the determined prediction mode,
wherein a first prediction block and a second prediction block are generated for the current block,
wherein a final prediction block for the current block is generated using a weighted sum of a first pixel of the first prediction block and a second pixel of the second prediction block,
wherein after a first indicator for the first prediction block is set to '0', motion information of L1 direction of a first adjacent block of the current block is used as first motion information to generate the first prediction block,
wherein the first prediction block is generated based on a motion vector and a reference picture index of the first motion information, and wherein the weighted sum is applied only to a first partial region of the first prediction block and a second partial region of the second prediction block.

3. A non-transitory computer-readable recording medium storing a bitstream generated by a video encoding apparatus performing a video encoding method, the video encoding method comprising:
- determining a prediction mode of a current block;
- performing inter prediction for the current block based on the determined prediction mode; and
- storing the bitstream comprising prediction mode information indicating the prediction mode in the non-transitory computer-readable recording medium,
- wherein a first prediction block and a second prediction block are generated for the current block,
- wherein a final prediction block for the current block is generated using a weighted sum of a first pixel of the first prediction block and a second pixel of the second prediction block,
- wherein after a first indicator for the first prediction block is set to '0', motion information of an L1 direction of a first adjacent block of the current block is used as first motion information to generate the first prediction block,
- wherein the first prediction block is generated based on a motion vector and a reference picture index of the first motion information, and
- wherein the weighted sum is applied only to a first partial region of the first prediction block and a second partial region of the second prediction block.

4. The image decoding method according to claim 1, wherein the first indicator indicates one of L0 direction and L1 direction for the inter prediction.

5. The image decoding method according to claim 1, wherein after the first indicator for the first prediction block is set to one of '0' and '1', motion information of '1—the first indicator' direction of the first adjacent block of the current block is used as motion information to generate the first prediction block.

6. The image decoding method according to claim 1, wherein the first partial region and the second partial region are determined based on boundary information for the current block.

7. The image encoding method according to claim 2, wherein the first partial region and the second partial region are determined based on boundary information for the current block.

8. The non-transitory computer-readable recording medium according to claim 3, wherein the first partial region and the second partial region are determined based on boundary information for the current block.

* * * * *